(12) United States Patent
Turner et al.

(10) Patent No.: US 10,707,961 B2
(45) Date of Patent: Jul. 7, 2020

(54) ADAPTIVE COMMUNICATION SYSTEM

(71) Applicant: Space Systems/Loral, LLC, Palo Alto, CA (US)

(72) Inventors: Andrew E. Turner, Mountain View, CA (US); Douglas Burr, San Jose, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 97 days.

(21) Appl. No.: 15/710,740

(22) Filed: Sep. 20, 2017

(65) Prior Publication Data

US 2019/0028197 A1     Jan. 24, 2019

Related U.S. Application Data

(60) Provisional application No. 62/452,174, filed on Jan. 30, 2017.

(51) Int. Cl.
    *H04B 10/00*      (2013.01)
    *H04B 10/118*     (2013.01)
    (Continued)

(52) U.S. Cl.
    CPC ....... *H04B 10/118* (2013.01); *H04B 7/18504* (2013.01); *H04B 7/195* (2013.01);
    (Continued)

(58) Field of Classification Search
    CPC ... H04B 10/118; H04B 7/18504; H04B 7/185
    See application file for complete search history.

(56) References Cited

U.S. PATENT DOCUMENTS 5,218,467 A    6/1993    Ross et al.
5,710,652 A    1/1998    Bloom et al.
(Continued)

FOREIGN PATENT DOCUMENTS

WO      9835506 A2    8/1998
WO      0158758 A2    8/2001

OTHER PUBLICATIONS

European Search Report, 18153976.8, dated Jun. 21, 2018.
(Continued)

*Primary Examiner* — David C Payne
*Assistant Examiner* — Pranesh K Barua
(74) *Attorney, Agent, or Firm* — Vierra Magen Marcus LLP

(57) ABSTRACT

Described herein is a satellite communications system that includes: two or more satellites using laser communications, and a communications relay aircraft adapted for flying at altitudes above clouds. The communications relay aircraft includes: a laser communications module to communicate with the satellite using laser communication and a Radio Frequency (RF) communications module to communicate with RF equipment at or near ground level using cloud-penetrating RF communications. The RF communications module is configured to take data received as laser communication and generate a corresponding RF transmission containing the data. The laser communications module is configured to take data received as RF communication and to generate a corresponding laser transmission containing the data.

20 Claims, 19 Drawing Sheets

(51) Int. Cl.
  *H04B 7/185* (2006.01)
  *H04B 7/195* (2006.01)
  *H04B 10/516* (2013.01)
(52) U.S. Cl.
  CPC ........... *H04B 10/516* (2013.01); *H04B 7/185* (2013.01); *H04B 7/18521* (2013.01)

(56) References Cited

U.S. PATENT DOCUMENTS

| | | | |
|---|---|---|---|
| 5,754,323 A | 5/1998 | Rivers et al. | |
| 6,304,354 B2 | 10/2001 | Carlson | |
| 6,327,063 B1* | 12/2001 | Rockwell | H04B 10/118 398/122 |
| 6,816,682 B1* | 11/2004 | Ionov | H04B 10/118 398/121 |
| 8,010,043 B2 | 8/2011 | Miller | |
| 8,437,892 B1* | 5/2013 | Hope | B64G 1/242 244/158.1 |
| 9,287,978 B2* | 3/2016 | Heine | H04B 10/118 |
| 9,555,904 B2* | 1/2017 | Abrams | B64G 1/222 |
| 2002/0171896 A1* | 11/2002 | Clark | H04B 10/1121 398/121 |
| 2004/0001720 A1* | 1/2004 | Krill | H04B 10/118 398/125 |
| 2004/0170427 A1* | 9/2004 | Penninckx | H04J 14/02 398/27 |
| 2005/0100339 A1* | 5/2005 | Tegge, Jr. | H04B 10/118 398/125 |
| 2007/0166048 A1* | 7/2007 | Doerr | H04J 14/0246 398/158 |
| 2008/0002981 A1* | 1/2008 | Valley | H04B 7/18521 398/121 |
| 2008/0051080 A1* | 2/2008 | Walker | H04B 7/2041 455/427 |
| 2009/0152402 A1* | 6/2009 | Massonnet | B64G 1/1021 244/158.2 |
| 2009/0154391 A1* | 6/2009 | Wittenschlaeger | H04L 41/12 370/316 |
| 2014/0016932 A1* | 1/2014 | Coleman | H04B 10/118 398/48 |
| 2014/0195150 A1* | 7/2014 | Rios | B64C 39/024 701/469 |
| 2015/0365870 A1* | 12/2015 | Lauer | H04B 17/318 370/331 |
| 2016/0223735 A1* | 8/2016 | Dong | G02F 1/133603 |
| 2016/0244189 A1 | 8/2016 | Turner | |
| 2016/0269116 A1 | 9/2016 | Welle et al. | |
| 2017/0026122 A1* | 1/2017 | Everett | H04B 10/118 |
| 2017/0034250 A1* | 2/2017 | Sobhani | H04B 7/18504 |
| 2017/0141849 A1* | 5/2017 | Thangavelautham | H04B 10/118 |
| 2017/0214462 A1* | 7/2017 | Busche | H04B 7/18504 |
| 2017/0230105 A1* | 8/2017 | Baudoin | H04B 7/18521 |
| 2018/0037336 A1* | 2/2018 | Rammos | H04W 84/005 |
| 2018/0062732 A1* | 3/2018 | Beckner | H04B 7/18504 |

OTHER PUBLICATIONS

Farserotu, "Scalable, Hybrid Optical-Re Wireless Communication System for Broadband and Multimedia Service to Fixed and Mobile Users", Wireless Personal Communications, Springer, Dordrecht, NL, vol. 24, No. 2, Jan. 1, 2003, 13 pages.
Horwath, et al., Broadband Backhaul Communication for Stratospheric Platforms: The Stratospheric Optical Payload Experiment (STROPEX), SPIE, 2006, vol. 6304, 12 Pages.
The Far-out Laser: Souping Up a Light Beam, Energy, Time, Inc. 1963, 2 Pages.
Israel, David, Considerations for an Earth Relay Satellite with RF and Optical Trunklines, NASA, 2016, 7 Pages.

\* cited by examiner

Amplifier

Switch

Feed

ADAPTIVE COMMUNICATION SYSTEM

PRIORITY CLAIM

This application claims priority to U.S. Provisional Patent Application No. 62/452,174, filed Jan. 30, 2017, which is incorporated by reference herein.

BACKGROUND

The present disclosure relates to technology for satellite communication systems.

Satellite communication systems typically include one or more satellites and a set of ground terminals. Such systems typically operate within regulations that allocate operating frequency bandwidth for a particular communications service and specify, among other things, a maximum signal power spectral density of communications signals radiated to the ground. A growing market exists for provision of high data rate, low-latency, communications services to individual consumers and small businesses which may be underserved by or unable to afford conventional terrestrial services. Satellite communications systems have been proposed to provide such high data rate communication services. However, designing a satellite system to meet these needs is challenging.

DETAILED DESCRIPTION

Figure 1:
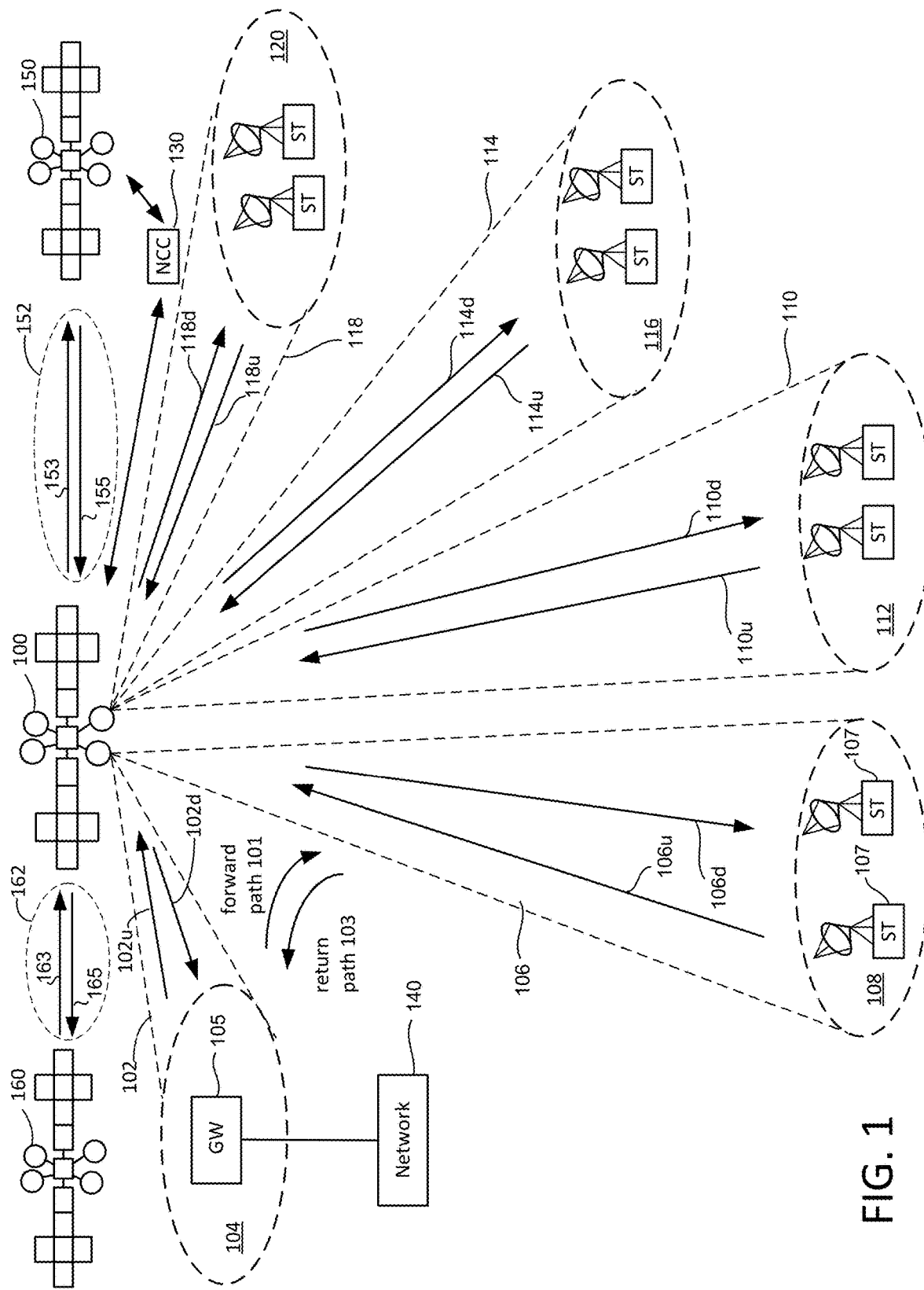
FIG. 1 is a block diagram describing a wireless communication system, which may be a satellite communication system.

Certain embodiments of the present technology described herein relate to communication systems that use optical communication between satellites in a satellite constellation to provide high-speed communication in space. Specific embodiments further relate to subsystems for integrating optical communication such as laser (light amplification by stimulated emission of radiation) communication from satellites in space with cloud-penetrating RF communications for communication at lower altitudes where clouds may prevent laser communication. For example, when cloud cover degrades direct laser communication in the atmosphere, cloud-penetrating RF communication may be used to communicate between the ground and a platform that is above the clouds, or sufficiently high that laser communication with satellites is possible at an acceptable speed. Communication between the platform and the satellites of the constellation can then use laser communication without being affected by clouds, or with reduced impact from clouds. Communication with equipment on the ground can use suitable RF frequencies with appropriate encoding schemes that ensure high-speed communication even when conditions are poor and signal-to-noise ratios may be low and can thus adapt to a range of different atmospheric conditions.

In an embodiment, a platform for converting between laser and RF communication is provided in a communications relay aircraft such as a High Altitude Pseudo Satellite (HAPS) aircraft that includes suitable equipment for converting data received through laser communications from satellites into RF communication that is relayed to ground, and for converting RF communication from ground into laser communication that is relayed to satellites in space. An alternative communications relay aircraft may use a balloon filled with lighter-than-air gas (e.g. helium or hydrogen). Advantageously, satellites in such a system may not have RF communication circuitry, which may save significant weight and thus reduce the cost of putting satellites in orbit while the system retains cloud-penetrating RF communication capacity where needed by using communications relay aircraft. Furthermore, satellites that relay laser communication may be relatively simple and may provide high-speed low-latency communication. A laser signal may be generated by a laser on the ground, or in a communications relay aircraft such as a HAPS, or other platform, and sent to a satellite where it is directed to another satellite, and then yet another satellite, and so on until it is sent back to earth, or to another communications relay aircraft, or other unit. Rather than demodulate the received signal at each satellite and then generate and modulate a transmitted signal, in this example, a laser communication may be amplified and redirected without demodulation or modulation. This may result in low latency even where laser communication passes through a large number of satellites. Such a system may be referred to as a "Photosphere system," in reference to a region of the Sun that does not produce light itself, but instead is illuminated from deeper regions within the Sun. Here, the satellite constellation may not produce light and instead may redirect laser beams that are generated at lower levels (e.g. ground or aircraft).

Because the speed of light in space is significantly faster than in optical fibers (about 300,000 km/sec compared with about 200,000 km/sec for optical fiber with an index of refraction of 1.5) such a system may provide lower latency than terrestrial fiber optic communication between two locations on the earth's surface when satellites orbit at low altitudes, e.g. on the order of 450 km above the earth's surface.

Prior to describing details of specific embodiments of the present technology, it is first useful to describe an exemplary wireless communication system with which embodiments of the present technology would be useful. An example of such a wireless communication system will now be described with reference to FIG. 1.

FIG. 1 depicts a block diagram of a wireless communications system that includes a communication platform, satellite 100, which may be located, for example, at a geostationary or non-geostationary orbital location. Where a satellite is in a non-geostationary orbit, the satellite may be a low earth orbit (LEO) satellite. Satellite 100 may be communicatively coupled to at least one gateway (GW) 105 and a plurality of subscriber terminals ST (including subscriber terminals 107). The term subscriber terminals may be used to refer to a single subscriber terminal or multiple subscriber terminals. A subscriber terminal ST is adapted for communication with the satellite 100, which as noted above, may be a satellite. Subscriber terminals may include fixed and mobile subscriber terminals including, but not limited to, a cellular telephone, a wireless handset, a wireless modem, a data transceiver, a paging or position determination receiver, or mobile radio-telephone, or a headend of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile. Where the communication platform of a wireless communication system is a satellite, the wireless communication system can be referred to more specifically as a satellite communication system. In accordance with certain embodiments, it is possible that a subscriber terminal with which one satellite wirelessly communicates is on a platform of or on another satellite.

In one embodiment, satellite 100 comprises a bus (e.g., spacecraft) and one or more payloads (e.g., the communication payload, an imaging payload, etc.). The satellite may also include a command and data handling system and multiple power sources, such as batteries, solar panels, and one or more propulsion systems, for operating the bus and the payload. The command and data handling system can be used, e.g., to control aspects of a payload and/or a propulsion system, but is not limited thereto.

The at least one gateway 105 may be coupled to a network 140 such as, for example, the Internet, terrestrial public switched telephone network, mobile telephone network, or a private server network, etc. Gateway 105 and the satellite 100 communicate over a feeder beam 102, which has both a feeder uplink 102u and a downlink 102d. In one embodiment, feeder beam 102 is a spot beam to illuminate a region 104 on the Earth's surface (or another surface). Gateway 105 is located in region 104 and communicates with satellite 100 via feeder beam 102. Although a single gateway is shown, some implementations will include many gateways, such as five, ten, or more. One embodiment includes only one gateway. Each gateway may utilize its own feeder beam, although more than one gateway can be positioned within a feeder beam. In one embodiment, a gateway is located in the same spot beam as one or more subscriber terminals. In certain embodiments, the feeder uplink 102u is an optical beam, such as a laser beam generated by a laser source. Such a laser beam may be in the visible spectrum, or in the infra-red or ultra-violet ranges. In other embodiments, the feeder uplink 102u is an RF beam. Similarly, it is possible that the downlink 102d is an optical beam or an RF beam, depending upon the embodiment.

Subscriber terminals ST and satellite 100 communicate over service beams, which are also known as user beams. For example, FIG. 1 shows service beams 106, 110, 114 and 118 for illuminating regions 108, 112, 116 and 120, respectively. In many embodiments, the communication system will include more than four service beams (e.g., sixty, one hundred, etc.). Each of the service beams have an uplink (106u, 110u, 114u, 118u) and a downlink (106d, 110d, 114d, 118d) for communication between subscriber terminals ST and satellite 100. Although FIG. 1 only shows two subscriber terminals within each region 108, 112, 116 and 120, a typical system may have thousands of subscriber terminals within each region. In the embodiments described herein, it is assumed that the service beams (both downlink and uplink) are RF beams, as opposed to optical beams.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to satellite 100 via feeder uplink 102u of feeder beam 102, through a first signal path on satellite 100, and from satellite 100 to one or more subscriber terminals ST via downlink 106d of service beam 106. An uplink (e.g., 102u) of a feeder beam (e.g., 102) can also be referred to more succinctly as a feeder uplink beam, and the downlink (e.g., 106d) of a service beam (e.g., a 106) can also be referred to more succinctly as a service downlink beam. Although the above example mentions service beam 106, the example could have used other service beams.

Data can also be sent from the subscriber terminals STs over the return path 103 to gateway 105. In one example, communication over the return path comprises transmitting the data from a subscriber terminal (e.g., subscriber terminal 107 in service beam 106) to satellite 100 via uplink 106u of service beam 106, through a second signal path on satellite 100, and from satellite 100 to gateway 105 via downlink 102d of feeder beam 102. An uplink (e.g., 106u) of a service beam (e.g., 106) can also be referred to more succinctly as a service uplink beam, and the downlink 102d of feeder beam 102 can also be referred to more succinctly as a feeder downlink beam. Although the above example uses service beam 106, the example could have used any service beam. In other examples, communication between subscriber terminals or other ground equipment may go through one or more satellites without going through a gateway.

FIG. 1 also shows that the satellite 100 can communicate with other satellites 150 and 160 over respective inter-satellite link (ISL) beams 152 and 162. For example, the satellite 100 can send data to the satellite 150 over a path 153 of the ISL beam 152, and can receive data from the satellite 150 over a path 155 of the ISL beam 152. Communication over a forward path can comprise, for example, transmitting data from the gateway 105 to the satellite 100 via the feeder uplink 102u, through a signal path on satellite 100, and from the satellite 100 to the satellite 150 via the path 153 of the ISL beam 152, through a signal path on the satellite 150, and then to one or more subscriber terminals ST via a service downlink beam. Communication over a return path can comprise, for example, transmitting data from a subscriber terminal to the satellite 150 via a service uplink beam, through a signal path on the satellite 150, and from the satellite 150 to the satellite 100 via the path 155 of the ISL beam 152, and from the satellite 100 to the gateway 105 via downlink 102d. In still another example, the satellite 100 can receive data over a path 163 of the ISL beam 162 from the satellite 160, and can send data over a path 153 of the ISL beam 152 to the satellite 150. These are just a few examples of how a ground based gateway can communicate with satellites, satellites can communicate with one another, and how satellites can communicate with service terminals STs, which examples not intended to be all encompassing. All of the satellites 100, 150 and 160 shown in FIG. 1 can be in a geostationary orbit. Alternatively, all of the satellites 100, 150 and 160 shown in FIG. 1 can be in a non-geostationary orbital, e.g., in a low earth orbit (LEO), and such satellites may only send an optical ISL beam from one satellite to another when the other satellite comes into the view of the optical coverage area of the satellite. It is also possible that one or more of the satellites 100, 150 and 160 shown in FIG. 1 can be in a geostationary orbit, while one or more of the other satellites is within a non-geostationary orbital, e.g., in a low earth orbit (LEO). In this latter case, a geostationary satellite and a non-geostationary satellite (e.g., an LEO satellite) may only be able to send an optical ISL beam between them when one of the satellites comes into the view of the optical coverage area of the other satellite. More generally, satellites that are in different types of orbits can send optical ISLs to one another using embodiments of the present technology described herein. This enables satellites to operate as optical repeaters without needing to demodulate and re-modulate optical signals being forwarded to another satellite. Instead, a satellite that is acting as an optical repeater may only need to amplify an optical ISL before it is passed onto another satellite, which can greatly simply the equipment onboard the satellite.

FIG. 1 also shows a Network Control Center (NCC) 130, which can include an antenna and modem for communicating with satellites 100, 150 and 160, as well as one or more processors and data storage units. Network Control Center 130 provides commands to control and operate satellites 100, 150 and 160. Network Control Center 130 may also provide commands to any of the gateways and/or subscriber terminals. It is also possible that the NCC includes transmitter and/or receiver optics for optically communicating with satellites 100, 150 and 160 or communicates with satellites 100, 150, and 160 through the optical gateway links such as feeder beam 102.

The architecture of FIG. 1 is provided by way of example and not limitation. Embodiments of the disclosed technology may be practiced using numerous alternative implementations.

Conventionally, a gateway (e.g., gateway 105) communicates with a satellite (e.g., satellite 100) using an antenna on the ground that transmits and receives RF (radiofrequency) signals to and from an antenna on the satellite. Certain embodiments of the present technology utilize optical components instead of antennas to transmit and receive optical signals between equipment on the ground and a satellite or between satellites, without using a gateway as will be described in additional details below.

Certain examples of the present technology involve the use of analog-over free-space optical signals, which leads to an elegant architecture for a satellite repeater. Certain examples allow for the aggregation of multiple user links without requiring extra hardware associated with an onboard demodulator and re-modulator, and thus reduce the mass, power and cost of the satellite, perhaps making the difference between being able to launch or not being able to launch the satellite. The frequency of a laser beam can be changed without the need for a system including a demodulator and a re-modulator, for example an ammonium dihydrogen phosphate crystal can be used to double the frequency of the beam. An amplifier could be used to boost the power of the signal after the frequency is altered to make up for losses as the beam is processed by the crystal, and this also would not involve demodulation and re-modulation of the beam. The capability to alter the frequency of the laser beam enables the system to avoid self-interference, for example outgoing laser beams from a spacecraft can be at a different frequency from incoming beams. Furthermore, two laser beams directed at a single spacecraft in the constellation from other spacecraft or the aircraft can be readily distinguished without interference if they are at two different frequencies. In addition, in accordance with specific examples where the uplink and downlink communication signals are modulated at transmit (forward) and receive (return) RF frequencies, no frequency conversion in the forward link is required on the satellite, thereby further simplifying the payload design. By contrast, previously envisioned free-space optical spacecraft architectures proposed demodulation of the optical signal, followed by routing to user link pathways and re-modulation of the signal on user link RF frequencies. In examples of the present technology, the only onboard demodulation and re-modulation would occur on the communications relay aircraft, whose equipment need not operate in space and can be readily repaired and upgraded when the aircraft are landed and serviced. Furthermore, the time for the signal to reach its destination, or latency, may be minimized by reducing the number of times that the signal is demodulated and re-modulated.

Figure 2:
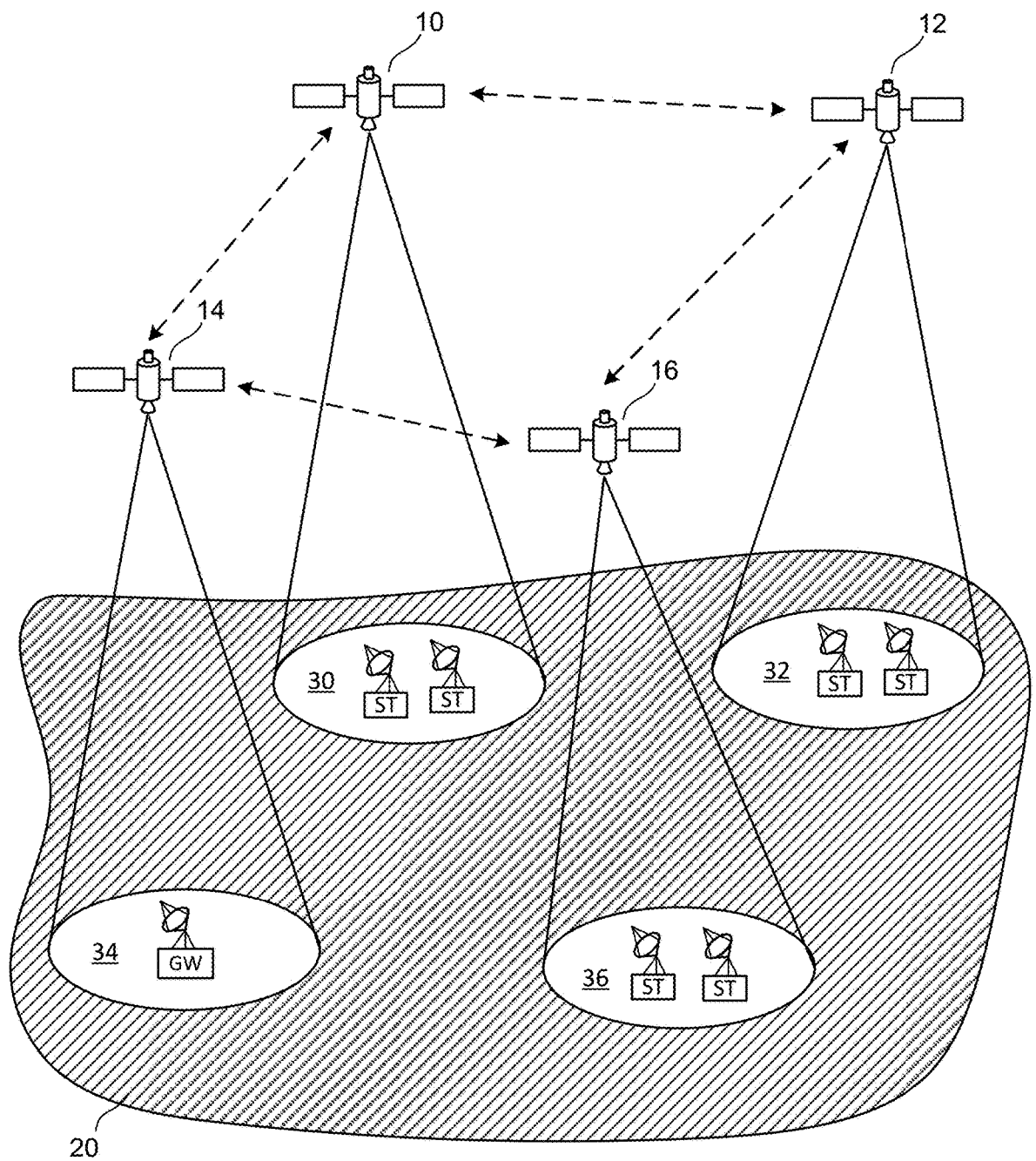
FIG. 2 depicts a portion of a satellite communication system.

FIG. 2 depicts a portion of satellite communications system that includes communication between satellites and ground terminals as well as communication between satellites. The satellite communications system includes satellites 10, 12, 14 and 16. In some embodiments, the satellite communication system will include more or less than four satellites. The four satellites of FIG. 2 are only a subset of satellites in one example of a satellite communication system. Shaded region 20 represents a portion of the surface of the Earth that is being serviced by satellites 10, 12, 14 and 16 at the moment in time depicted in FIG. 2. Satellite 10 is servicing region 30 with one or more spot beams. Satellite 12 is serving region 32 with one or more spot beams. Satellite 14 is servicing region 34 with one or more spot beams. Satellite 16 is servicing region 36 with one or more spot beams. Each of the regions 30, 32, 34 and 36 include many subscriber terminals ST and one or more gateways GW. For example, purposes only, FIG. 2 shows two subscriber terminals ST in region 30, two subscriber terminals ST in region 32, two subscriber terminals ST in region 36, and one gateway GW in region 34. However, each of the regions depicted may have many ground terminals including subscriber terminals ST (e.g., thousands) and many gateways GW.

Each of the satellites 10, 12, 14 and 16 can communicate messages back and forth with subscriber terminals ST and one or more gateways GW in the region being serviced. For example, the subscriber terminals ST depicted in FIG. 2 that are in region 30 can communicate messages to and from satellite 10, the subscriber terminals ST depicted in region 32 can communicate messages to and from satellite 12, gateway GW in region 34 can communicate messages to and from satellite 14, and the subscriber terminals ST depicted in region 36 can communicate messages to and from satellite 16.

FIG. 2 also shows dashed arrows to indicate communication between the satellites. Each of the dashed arrows represent an inter-satellite link. For example, satellite 10 can directly communicate with satellites 12 and 14. Satellite 16 can directly communicate with satellites 12 and 14. For satellite 16 to communicate with satellite 10, messages have to be passed via satellite 12 or satellite 14. For example, a subscriber terminal ST in region 36 wishing to communicate with a subscriber terminal ST in region 30 will send a message to satellite 16, which will forward that message to satellite 12, which will forward that message to satellite 10, which will forward that message to the subscriber terminal ST in region 30. A subscriber terminal ST in region 30 wishing to communicate with a gateway GW in region 34 will send a message to satellite 10, which will forward that message to satellite 14, which will forward that message to the gateway GW in region 34.

Each of the inter-satellite links depicted by dashed arrows in FIG. 2 form a wireless in-space network. There are many different suitable configurations for placement and movement of the satellites that comprise the communication system, and there are many different suitable architectures of the in-space network. In one embodiment, it is proposed that the constellation of satellites orbit the earth in a set of planes, with each plane representing an orbit around the Earth.

Figure 3:
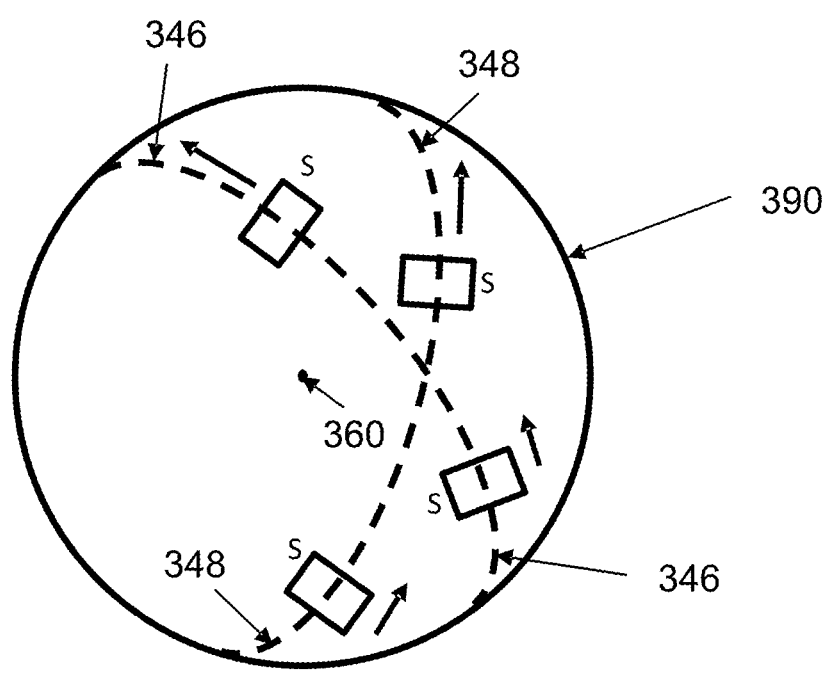
FIG. 3 shows an example of a satellite constellation orbiting the earth.

FIG. 3 depicts a constellation of satellites S in orbit around the Earth 390. In one embodiment, each of the satellites of the constellation depicted in FIG. 3 can be Low Earth Orbit (LEO) satellites. In other embodiments, the satellites can be Medium Earth Orbit (MEO) satellites. Other types of satellites (and other distances from the earth) can also be used. Surrounding the Earth 390 are a set of planes such as planes 346 and 348 shown in FIG. 3 (just two planes are shown for clarity, it will be understood that any suitable number of planes may be provided), each representing an orbit around the Earth. FIG. 3 also shows a plurality of satellites S representing the constellation of satellites. Each satellite of the constellation is orbiting the Earth 390 in one of the planes 346, 348. In one embodiment, the constellation of satellites S includes satellites 10, 12, 14 and 16 of FIG. 2. The arrangement of planes 346, 348 and other planes (not shown) may provide continuous coverage of the entire Earth, or a substantial portion of the Earth (e.g. omitting Arctic and Antarctic regions). Planes may form "streets of coverage" with satellites following each other as they orbit so that before a satellite disappears from view another satellite appears over the horizon.

The geographical location of a satellite S is given by (lons, lats) indicating the longitude and latitude of the location of satellite S. In one embodiment, it is assumed that the entire Earth (or portion of the Earth) is covered by logical locations of the satellites S. These logical locations are serviced by the nearest satellite S. The identity of a satellite is not permanently coupled with a current logical location, as the satellites are orbiting Earth and a current logical location for a satellite will be taken over by a successor satellite, which need not be in the same orbital plane. This is referred to as a handover.

The satellites S of the constellation depicted in FIG. 3 may be configured to wirelessly communicate with other satellites (e.g., neighbors) via optical communication using laser light travelling through free-space. There are many architectures and topologies that can be used for the in-space network formed by the inter-satellite links and the present technology is not limited to a particular arrangement.

Figure 4:
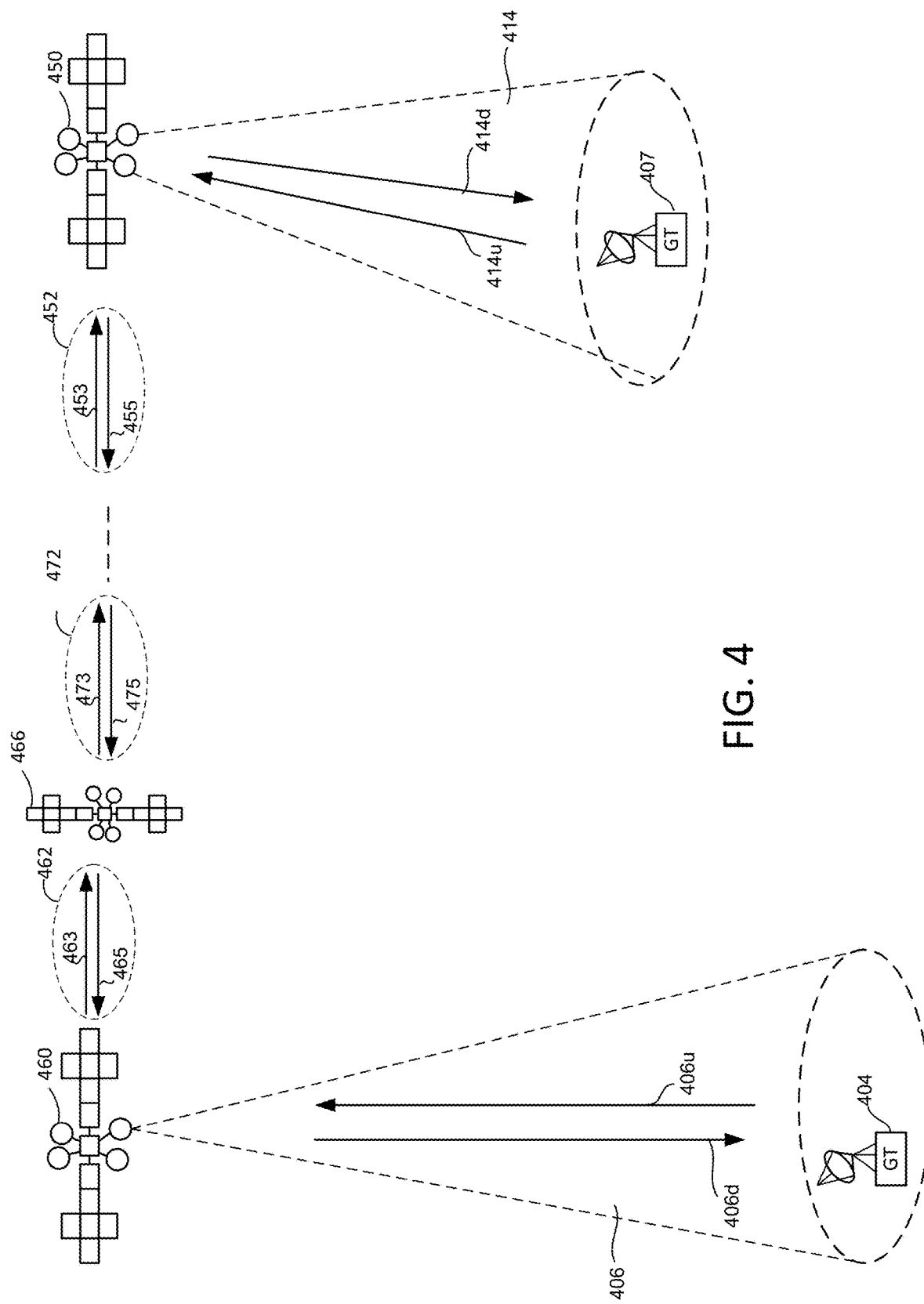
FIG. 4 shows communication between ground terminals through a satellite constellation.

FIG. 4 illustrates an example of communication between ground terminals (which may be subscriber terminals, gateways, or other equipment at or near ground level) through a satellite constellation. For example, ground terminals 404, 407 may both be user terminals such as handheld devices that communicate without a gateway. A first ground terminal 404 is shown in communication with a second ground terminal 407 via a series of satellite-to-satellite links through a satellite constellation. Ground terminal 404 communicates with a first satellite 460 through wireless communication 406 (e.g. RF or optical communication). Wireless communication 406 is bi-directional and includes a downlink 406$d$ and an uplink 406$u$. First satellite 460 is in communication with second satellite 466 through inter satellite link (ISL) 462. First satellite 460 can send data to the satellite 466 over a path 463 of the ISL 462, and can receive data from the satellite 466 over a path 465 of ISL 462. Satellite 466 is also in communication with at least one additional satellite (not shown) via ISL 472, which includes paths 473 and 475 to allow bi-directional communication. Communication may travel from satellite to satellite through any number of satellites to its destination in this way without passing through a gateway. In other examples, communication may pass through a gateway as in FIG. 1. The number of satellites used for a given communication may depend on the locations of the two ground terminals that are to be connected, locations of satellites, other communication traffic, and other factors. FIG. 4 shows satellite 450 which is the last satellite in the series of satellites used for the communication shown. Satellite 450 is in communication with another satellite (next-to-last satellite in the series, not shown) over ISL 452, which includes path 453 and 455. Satellite 450 is in communication with ground terminal 407 via wireless communication 414 that includes an uplink 414$u$ and a downlink 414$d$. While the example shown in FIG. 4 shows a one-to-one communication between ground terminals over a chain of ISLs, it will be understood that such communication is not necessarily one-to-one. For example, multi-party communication may occur between multiple ground terminals using multiple chains of ISLs. Communication pathways in such a system may extend between ground terminals without passing through a gateway as shown and thus may have significantly lower latency than if a communication passed through a gateway. One-to-many communication may use all, or a substantial number of satellites in a constellation that are over a particular region, for example, to broadcast data (e.g. video or audio data) to a region.

A satellite constellation that uses only optical communication (e.g. laser communication) may provide several advantages over systems that use RF communication. Available RF bandwidth is limited and interference with other RF communication may occur. In contrast, laser communication is not limited by bandwidth allocation regulations and interference between laser signals has a low probability of occurring. Laser communication systems may be more secure because intercepting laser signals is generally more difficult than intercepting RF signals. Power requirements for laser communication may be lower than RF communication for the same signal-to-noise ratio. Thus, laser-based satellite communication has many advantages.

Ground-to-satellite communication by laser has similar advantages. Where satellites use lasers for inter-satellite and satellite-ground communication, such satellites may be made without RF components. This may save significant weight and make such a constellation cheaper to put into orbit. In some cases, satellites in such constellations may not require laser generating components (such as laser diodes) because they simply redirect a received laser communication, with some amplification in some cases, so that demodulation and modulation circuits may not be needed. In this case, laser communication beams may initially be generated by ground terminals and sent to satellites, then sent from satellite-to-satellite until they are sent back to ground stations. While some power is used to amplify laser communication beams in such systems, lasers are initially generated where weight is not as great a concern as in space (e.g. by ground terminals). Such laser beams may be relatively high powered to reduce amplification needed in the satellite constellation while ensuring a high signal-to-noise ratio.

While a laser-only communication system has many advantages over systems that use RF communication, there are some challenges. For example, laser communication between a ground terminal and a satellite may be more affected by clouds than RF communication. Obviously, clouds do not affect inter-satellite laser communication because satellites orbit above any clouds. However, clouds may present a barrier to laser ground-satellite communication. While it is possible to use lasers for inter-satellite communication and use RF for ground-satellite communication, this requires that satellites include RF communication components in addition to laser communication components, including laser generating components. Furthermore, generating RF communications and laser communications in a satellite may require substantial power.

Figure 5:
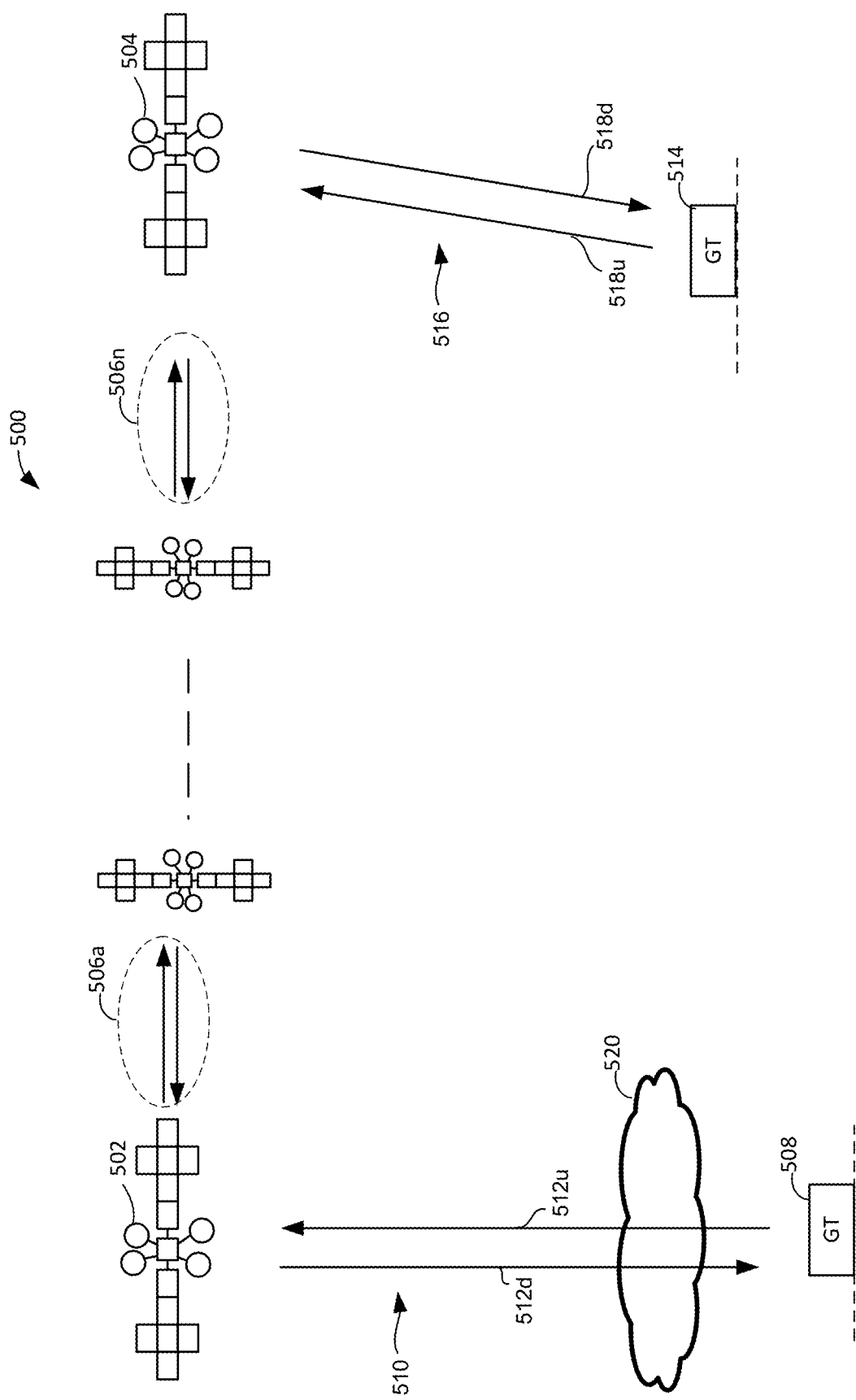
FIG. 5 illustrates an optical communication system affected by cloud.

FIG. 5 shows an example of a portion of a communication system 500 that includes a constellation of satellites that use laser communication for both inter-satellite communication and ground-satellite communication. A first satellite 502 communicates through a series of laser ISLs 506a-n with a last satellite 504. The number of satellites, n, in such a chain may be any number depending on the constellation used, locations of the ground terminals, and other factors. First satellite 502 is also in communication via laser with ground terminal 508 over laser communication 510, which includes laser downlink 512d and laser uplink 512u. Similarly, last satellite 504 is in communication with ground terminal 514 over laser communication 516, which includes laser uplink 518u and laser downlink 518d. While communication between ground terminal 514 and last satellite 504 is uninterrupted by clouds, a layer of cloud 520 extends between ground terminal 508 and first satellite 502. Cloud 520 may be at ground level (fog), low level, such as cumulus, stratus, or cumulonimbus, mid-level, such as altostratus, altocumulus, or nimbostratus, or high level, such as cirrus, cirrostratus, or cirrocumulus, or any combination of such clouds. Rain, thunder, lightning, and other weather phenomena may also be present and may degrade communications. In general, laser communication is degraded by the presence of clouds along a path taken by the laser communication. While this may be true for RF communication also, laser communication is generally more severely impacted by clouds than RF communication is. Depending on the nature of the clouds along a particular communication path, communication may be degraded to different degrees, or may be impossible. Communication may be possible with some additional redundancy in some cases, but the speed of communication may be affected. While some locations may suffer infrequently from the effects of clouds, other locations may frequently be affected.

Figure 6A:
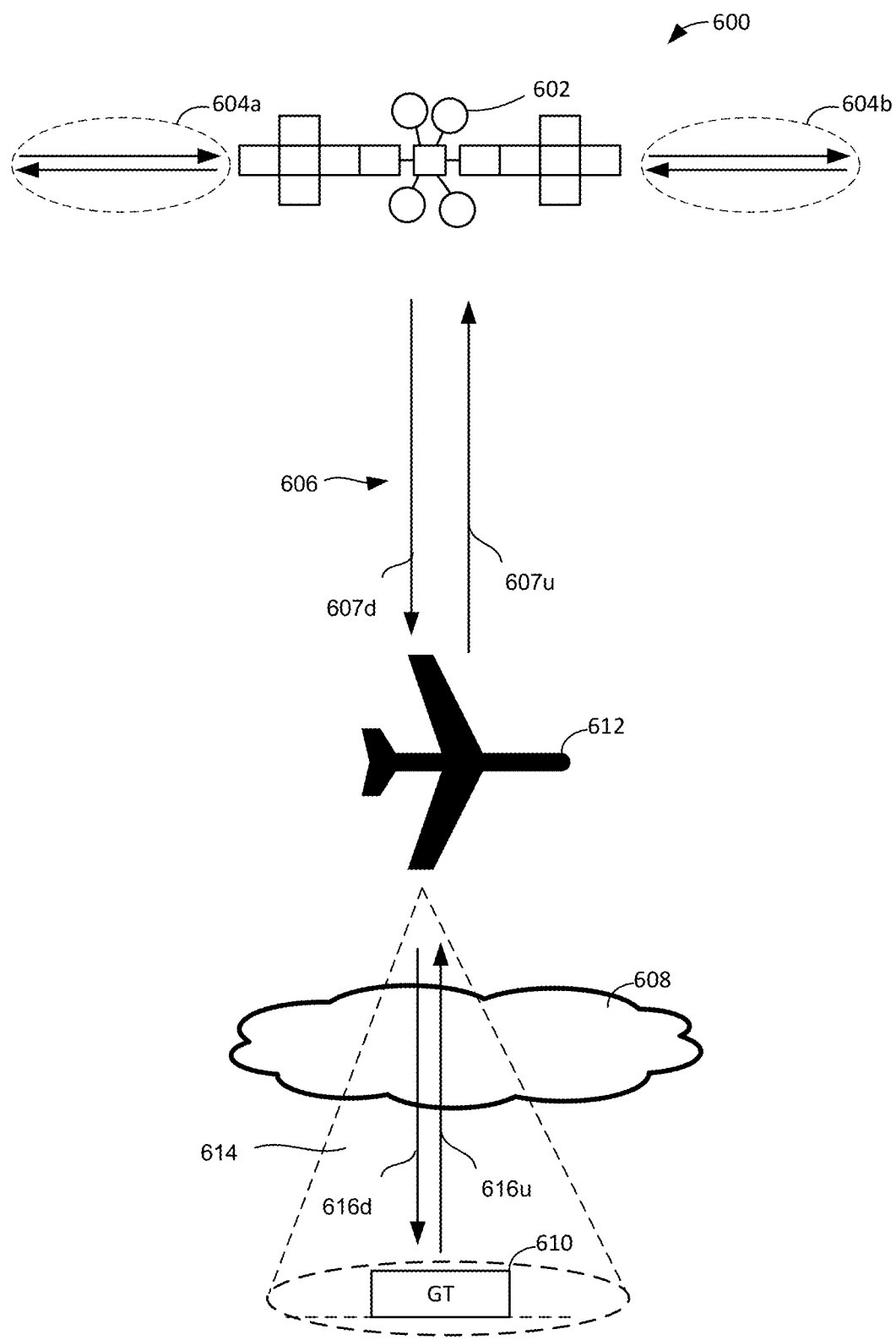
FIGS. 6A-C illustrate an example of a communications system with one or more communications relay aircraft that convert between optical and RF communication.

FIG. 6A shows a portion of a communication system 600 that includes a satellite 602 that is configured for inter-satellite laser communication via ISLs 604a-b and laser communication 606, which includes laser uplink 607u and laser downlink 607d. In some cases, such a satellite may have no RF communication components. As shown in FIG. 6A, a cloud 608 is present between satellite 602 and a ground terminal 610. A communications relay aircraft 612 flies above cloud 608 so that it can maintain laser communication with satellite 602 via laser communication 606. Because communications relay aircraft 612 is above cloud 608 it has an unobstructed path to satellite 602 (a "clear view") and communications relay aircraft 612 may communicate with satellite 602 at a high speed. Communications relay aircraft 612 maintains RF communication 614 with ground terminal 610. RF communication 614 includes RF uplink 616u and RF downlink 616d.

RF communication 614 may be cloud-penetrating RF communications adapted to maintain a high-speed communication through cloud 608 in several ways. It will be understood that the distance between communications relay aircraft 612 and ground terminal 610 is significantly less than the distance between satellite 602 and ground terminal 610. For example, a low earth orbit satellite may orbit in the range of 400 km to 2,000 km above the earth's surface while a communications relay aircraft may fly from near ground level to an altitude that is somewhat higher than regulated aviation space (e.g. higher than about 60,000 feet or 20 km, in a range of 20 km-25 km, for example). Thus, a relay aircraft may be at least twenty times closer to a ground terminal than a LEO satellite is. Communications relay aircraft 612 is configured to relay communication received from satellite 602 via laser downlink 607d as RF communication via RF downlink 616d. RF downlink 616d may be transmitted using a transmission scheme that is adapted for transmission through cloud.

A transmission scheme may be used to ensure that errors caused by a noisy channel created by cloud, rain, or other weather may be corrected. For example, Adaptive Coding Modulation (ACM) may be used to adapt to changing conditions. Using ACM, the modulation format and Forward Error Correction (FEC) codes (modcodes) may be adapted to better match the link conditions for different users in a multi-user system. ACM can be used in both directions. A return channel may be used to report the conditions of a receiving terminal such as a ground terminal or airborne terminal. Link conditions are often characterized by a signal to noise ratio (SNR) or signal-to-interference-plus-noise ratio (SINR). Lower order modulation and lower code rate are more reliable but require more time to transmit the same size message. Using ACM, each packet in a packet network may be transmitted at an optimized modulation and coding (modcode) level given the destination terminal's link conditions. An appropriate transmission frequency may be selected for cloud-penetrating RF communication, for example, an appropriate frequency in the C, Ku, Ka or other suitable bands, and frequency may be optimized for conditions by making adjustments as conditions change.

A relatively high-power signal may be used to transmit RF downlink 616d, compared with laser downlink 607d. Power may not be as limited on communications relay aircraft 612 as on satellite 602 because communications relay aircraft 612 can land and refuel, or be refueled in-flight while satellite 602 cannot easily be refueled and may rely on solar panels or other limited power source. Communications relay aircraft 612 may also relocate easily according to cloud patterns to take advantage of windows of limited cloud cover or no cloud cover. While satellites are not easily maneuvered, an aircraft can fly to a location that provides better communication through, or around a given cloud formation. While FIG. 6A shows communication between communications relay aircraft 612 and satellite 602, it will be understood that satellite 602 may be part of a constellation of satellites and that by maintaining high-speed communication between ground terminal 610 and satellite 602, communications relay aircraft 612 thereby maintains high-speed communication between ground terminal 610 and a large number of satellites around the earth and a large number of ground terminals that are in communication with the satellites.

Using a communications relay aircraft, such as communications relay aircraft 612, allows communication system 600 to adapt to weather patterns or other events that may affect direct satellite-ground communication. Communications relay aircraft may be used as needed depending on system usage requirements and weather patterns or other disruption (e.g. smoke from forest fires, brush fires, or volcanic eruptions). For example, communications relay aircraft may be used over large cities or other concentrations of users that demand high-speed communication in all weather conditions while relay aircraft may not be needed over more sparsely populated areas. Communications relay aircraft may not be used, or may be infrequently used over areas with sunnier climates while relay aircraft may be used frequently over areas that are frequently overcast.

Figure 6B:
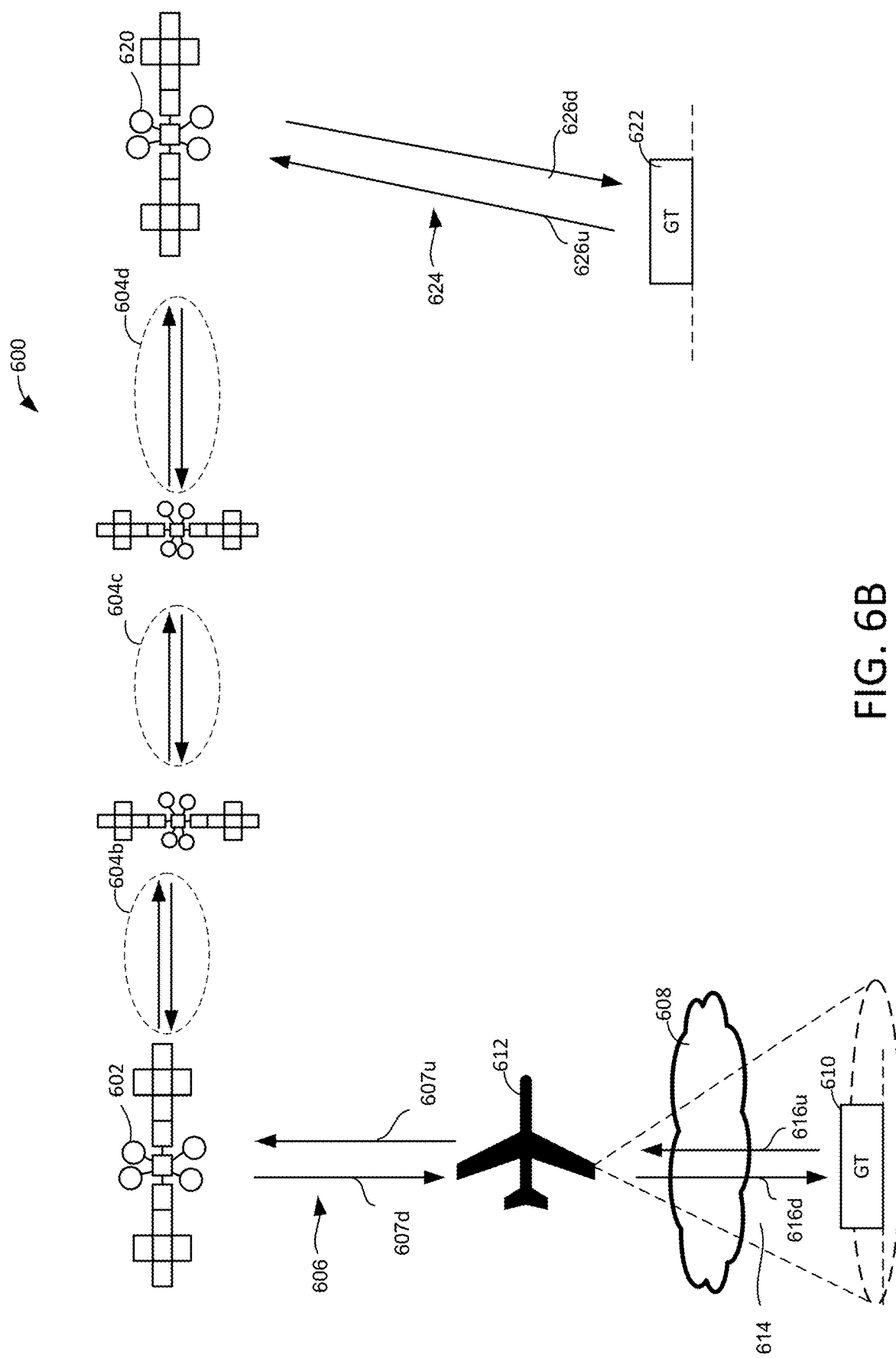

FIG. 6B shows additional portions of communication system 600 including a series of inter-satellite links 604b-d that connect satellite 602 with satellite 620. In this example, inter-satellite links 604b-d use laser communication. Satellite 620 is in communication with ground terminal 622 using laser communication 624, which includes laser uplink 626u and laser downlink 626d. At this location, there are no clouds to degrade laser communication so that laser communication 624 can maintain high-speed with an acceptable error rate. Thus, laser communication extends from ground terminal 622, through inter-satellite links 604b-d in a satellite constellation, and as far as communications relay aircraft 612, where laser communication is converted to RF communication for the remaining distance between communications relay aircraft 612 and ground terminal 610. Thus, laser communication may be used over thousands of kilometers and RF communication may be used as-needed for the last few kilometers (e.g. 1-100 km). It will be understood that at any given time, many such communication paths may extend through a constellation of satellites to connect many ground terminals. Many of these communication paths may not employ a communications relay aircraft, for example, where communication is between ground terminals that have clear skies that allow direct satellite-ground communication. Communications relay aircraft may be provided on an as-needed basis over particular locations while other locations continue to use direct satellite-ground laser communication. At times, no relay aircraft may be needed in such a communications system, while at other times, relay aircraft may be present at one or more locations because of weather or other impediments to direct satellite-ground laser communication.

Communications relay aircraft are not limited to relaying a single communication at a time. While FIGS. 6A-B show a single ground-aircraft RF communication and a single aircraft-satellite laser communication, communications relay aircraft may be in communication with multiple ground terminals via multiple RF communications and may be in communication with multiple satellites via multiple laser communications.

Figure 6C:
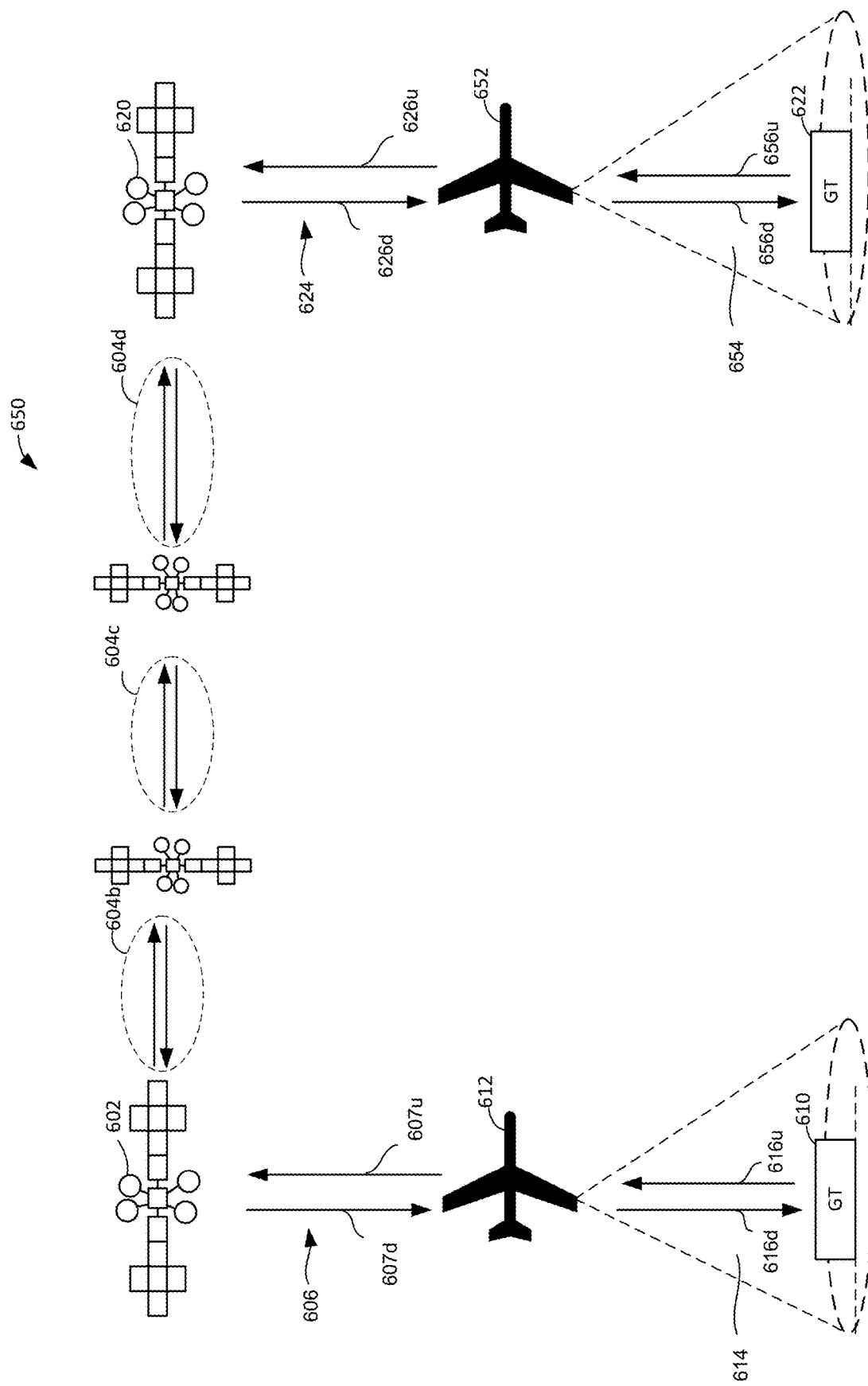

In other examples, such as shown in FIG. 6C, communications relay aircraft may be used even in conditions that would allow ground-to-satellite laser communication. For example, in a system in which some or all ground terminals are RF terminals and are not equipped for laser communication and satellites communicate using lasers and are not equipped for RF communications, communications relay aircraft may provide a bridge between laser-based and RF-based communication. System 650 is similar to system 600 of FIG. 6B. However, instead of direct laser communication between satellite 620 and ground terminal 622, communication relay aircraft 652 is in communication with satellite 620 through laser communication 624 and is in RF communication with ground terminal 622 through RF communication 654, which includes downlink 656d and uplink 656u. Communications relay aircraft 652 relays communication in both directions and performs appropriate conversion (e.g. RF-to-laser and laser-to-RF). Thus, ground terminals 610 and 622 may be RF-only terminals (without laser capability) while satellites 602, 604b-d and 620 may be laser-only (without RF capability) making them simpler and cheaper than if they had both laser and RF capability. For example, ground terminals may be lightweight handheld terminals while satellites may be simple light satellites. One or more ground terminals in such a system may be connected to a terrestrial network such as the Internet and may provide access to the network to other ground terminals that are not connected.

Figure 7:
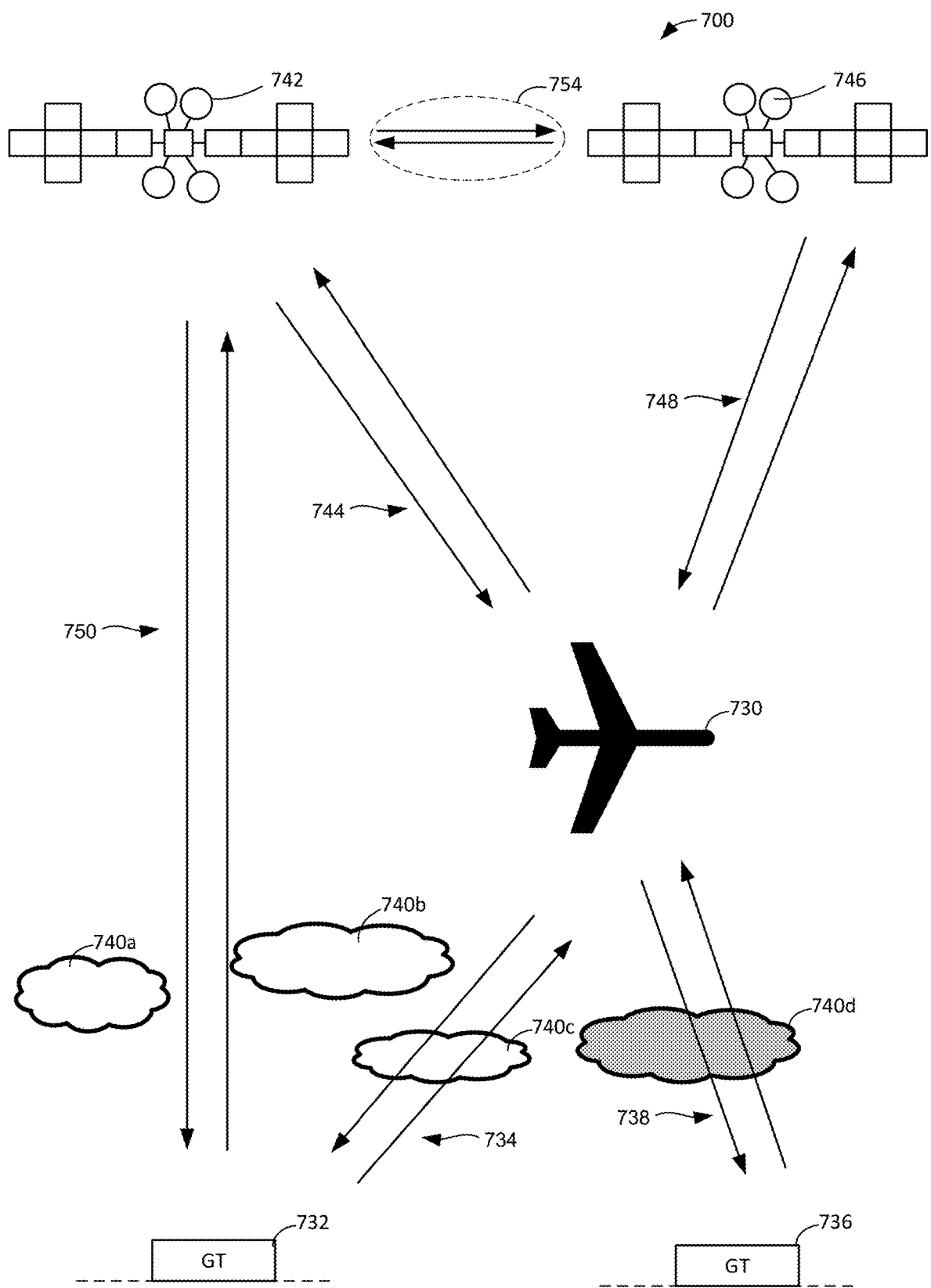
FIG. 7 illustrates an example of a communication system and some communications that a communications relay aircraft may facilitate.

FIG. 7 illustrates an example of a communication system 700 that includes a communications relay aircraft 730 that is in communication with ground terminal 732 over RF communication 734 and with ground terminal 736 over RF communication 738. Clouds 740a-d are present above ground terminal 732, 736. RF communication may be adjusted according to clouds that are present along a particular path. For example, where RF communication 734 and 738 travel through different clouds that cause different signal degradation, different RF communication may be used. For example, different frequencies, different signal strengths, different encoding schemes (including redundancy schemes) and other differences may be used to maintain RF communication that is adapted to conditions along a particular pathway. For example, where cloud 740c along the path of RF communication 734 is relatively thin and causes relatively little degradation compared with cloud 740d along path of RF communication 738, RF communication 738 may use higher power and more redundancy than RF communication 734. In some situations, a communications relay aircraft may serve many (e.g. over a hundred) ground terminals using a range of different RF communication schemes.

Communications relay aircraft 730 is in communication with satellite 742 via laser communication 744 and is in communication with satellite 746 via laser communication 748. At any given time, a communications relay aircraft may be able to establish laser communication with multiple satellites, particularly where a constellation of LEO satellites includes a large number of satellites (e.g. more than 5,000, or about 10,000). A communications relay aircraft may maintain laser communication with multiple satellites in parallel to increase communication capacity. In some cases, a communications relay aircraft may simply relay a given RF communication from one ground terminal as laser communication to a corresponding satellite in a one-to-one arrangement (i.e. linking a first ground terminal with a first satellite, linking a second ground terminal with a second satellite, and so on). In other cases, a communications relay aircraft may combine communications when relaying them. For example, two or more RF communications from two or more ground terminals may be combined and relayed as a single laser communication to a single satellite (e.g. RF communications 734 and 738 may be combined into laser communication 748). In some cases, hundreds of communications are combined. Similarly, two or more laser communications from two or more satellites may be combined and relayed as a single RF communication to a single ground terminal (e.g. laser communications 744 and 748 may be combined into RF communication 738). A communications relay aircraft may act as an adaptive communication node that relays communications in various ways according to demands and according to degradation encountered along various communication pathways.

FIG. 7 shows laser communication 750 directly from ground terminal 732 to satellite 742. A break between clouds 740a and 740b allows direct laser communication as shown. The use of a communications relay aircraft does not preclude direct satellite-ground laser communication and instead may be used to supplement such communication. While clouds may affect laser communication, direct laser communication at some data rate may be possible through clouds in some conditions. A ground terminal that is equipped to operate multiple communications in parallel can thus maintain direct laser communication with a satellite while also communicating through RF communication with a communications relay aircraft. In some cases, where one or more possible communication paths are available, for example, a direct laser communication path and an indirect path using RF communication to a communications relay aircraft and laser communication from the communications relay aircraft to a satellite, an appropriate communications path or paths may be selected on the basis of communication speed, latency, or other factors. In some cases, clouds may prevent direct laser communication from a ground terminal to a satellite while direct laser communication from the ground terminal to an appropriately placed communications relay aircraft may be possible because the pathway to the aircraft is clear, e.g. the aircraft is over a gap in the clouds. In some cases, a communications relay aircraft may be configured for direct laser communication with ground terminals in order to take advantage of such conditions.

While satellite 742 is in communication with satellite 746 over laser communication 754, in other examples, a communications relay aircraft may facilitate communication between satellites (either supplementing direct communication or providing indirect communication where direct communication is not available for some reason). Thus, for example, communications relay aircraft 730 may relay laser communication 744 from satellite 742 as laser communication 748 to satellite 746 (to supplement direct laser communication 754, or in place of direct laser communication 754). Similarly, communications relay aircraft 730 may relay RF or laser communication with one ground terminal as RF or laser communication with another ground terminal. Thus, a communications relay aircraft is not limited to facilitating satellite-ground communication. It may also facilitate satellite-satellite communication and/or ground-ground communication. In some cases, satellites may be components of different satellite constellations, owned by different owners, and/or use different communication protocols. A communications relay aircraft may be configured to communicate simultaneously with two or more such satellites even where such satellites cannot communicate with each other. This may include being configured for RF communication with satellites that use RF communication or other communication and may also include communication with geostationary satellites or other satellites that are not LEO satellites.

Figure 8:
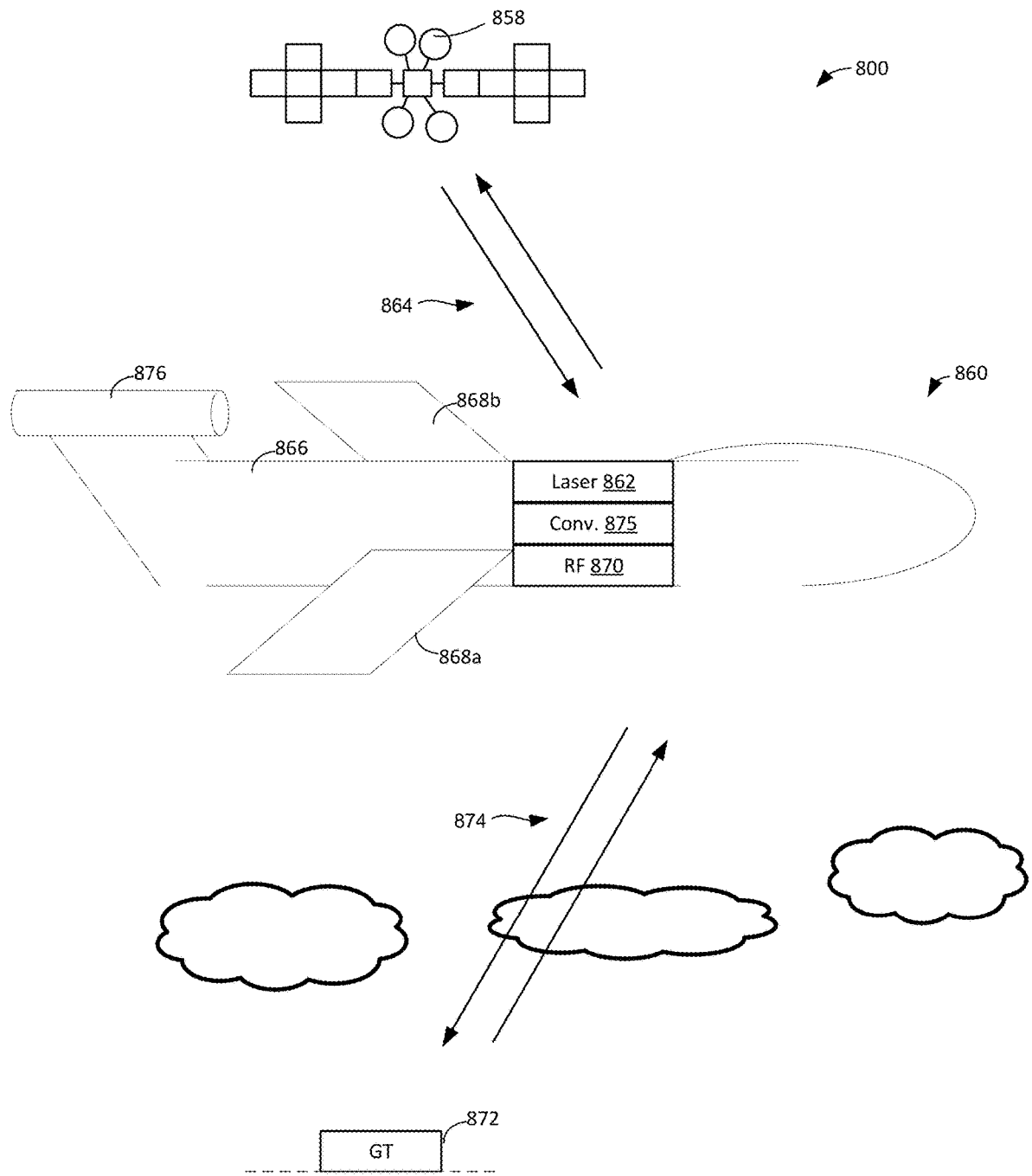
FIG. 8 illustrates an example of a communications relay aircraft that includes wings and a jet engine.

FIG. 8 shows a portion of a communication system 800 that includes a satellite constellation (satellite 858 is one of many satellites in the constellation) and a communications relay aircraft 860. Communications relay aircraft 860 includes a laser communications module 862 that is in direct laser communication with satellite 858 through laser communication 864. Laser communications module 862 is generally mounted so that laser communication can be directed upward from communications relay aircraft 860. For example, laser communication module may be mounted in an upper surface of fuselage 866 as shown, or may be mounted on an upper surface of wings 868a-b, or otherwise mounted so that it has an unobstructed pathway to direct laser communication 864 towards one or more satellites, such as satellite 858. Communications relay aircraft 860 also includes an RF communications module 870 that is directed downward for communication with ground terminals, such as ground terminal 872 via RF communication 874. A conversion module 875 is located between laser communications module 862 and RF communications module 870 and is configured to convert laser (optical) communication received by the laser communication module for resending as RF communication by RF communication module 870 and to convert RF communication received by RF communication module 870 for resending as laser communication by laser communication module 862.

Communications relay aircraft 860 is adapted for flying at high altitude in this example. Communications relay aircraft 860 includes a jet engine 876 and wings 868a-b that may be adapted for high altitude flying. For example, jet engine 876 (and additional jet engines if more than one jet engine is provided) may be adapted for operation at high altitude/low pressure where air has low density and wings 868a-b may be adapted to provide sufficient lift even at high altitude when communications relay aircraft 860 is driven by jet engine 876 (e.g. wingspan and airfoil cross-sectional shape may be adapted to generate sufficient lift to maintain a cruising altitude of 65,000 feet). High altitude may mean an altitude higher than commercial aircraft generally use, higher than about 40,000 feet, or may mean higher than regulated airspace which is higher than about 60,000 feet or 20 kilometers. It may be advantageous to maintain a communications relay aircraft above regulated airspace so that it may remain over large population centers, which may have congested airspace at lower levels, without needing to comply with regulation that would apply at lower levels (e.g. complying with air traffic control instructions and avoiding restricted airspace).

In some cases, a communications relay aircraft may be a pilotless aircraft so that no pressurized cabin or other pilot-related facilities are required. Such an aircraft may be remotely operated and/or may be substantially automated so that it continues to fly in a designated area without human intervention for substantial periods. Such a pilotless aircraft flying at high altitude over a given location may be referred to as a High Altitude Pseudo Satellite (HAPS) aircraft.

Communications relay aircraft are not limited to high altitudes. Where cloud is low-lying, it may be sufficient for a communications relay aircraft to fly a short distance above the clouds, which may be relatively low. In some cases, such a communications relay aircraft may operate at a height where some clouds remain above it as long a sufficient laser communication speed is possible with one or more satellites (i.e. it is not always necessary to be above cloud level). In some cases, commercial aircraft may be configured to act as communications relay aircraft. For example, placing a suitable equipment, including laser and RF communications equipment, on a commercial aircraft may allow the aircraft to be used as a communications relay aircraft whenever it is flying above clouds. Commercial aircraft are generally clustered around population centers so that when there is cloud cover over such a population center commercial aircraft in the area may be used to improve communication speed by providing an RF bridge to a laser based satellite constellation.

Figure 9:
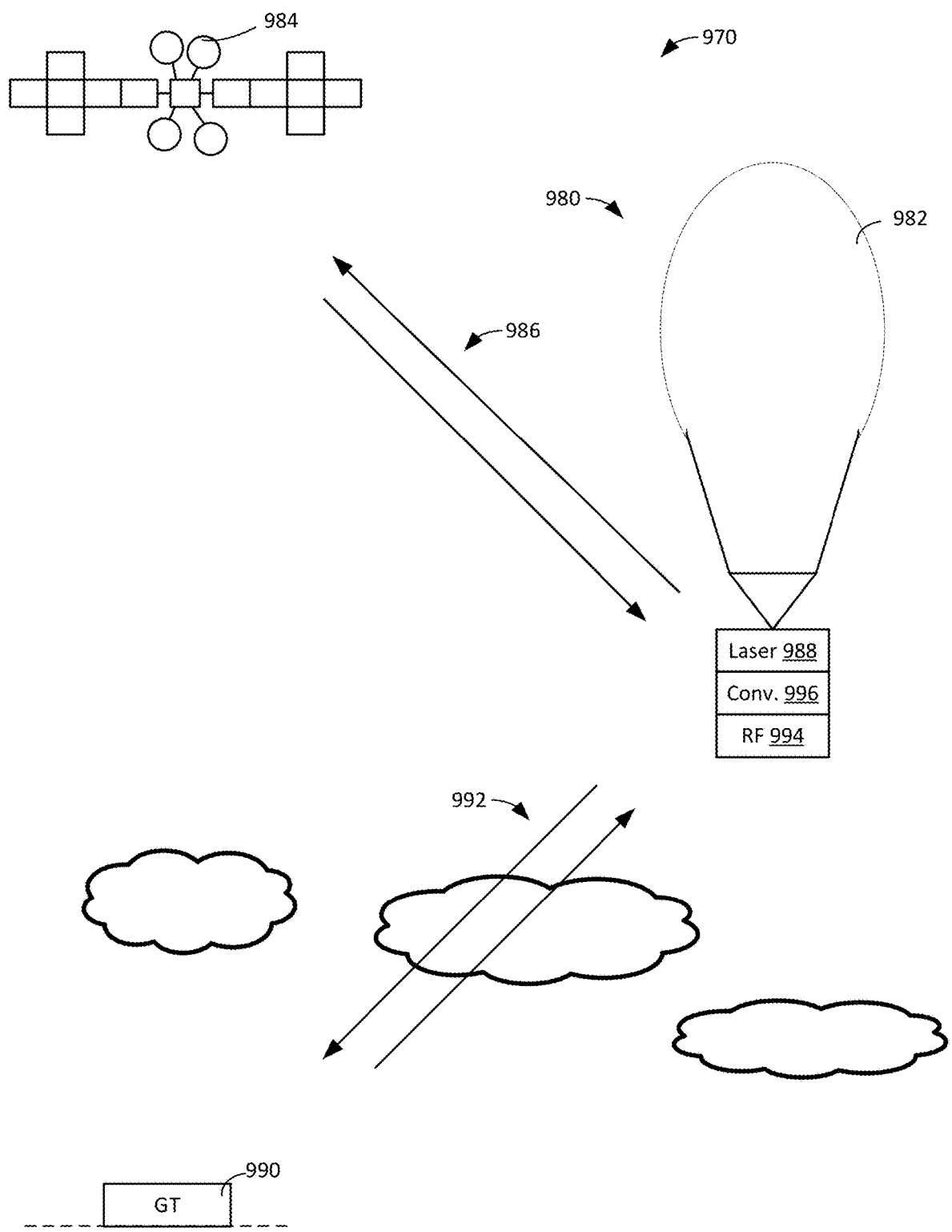
FIG. 9 illustrates an example of a communications relay aircraft that includes a balloon filled with lighter-than-air gas.

FIG. 9 shows an example of a system 970 that includes a communications relay aircraft 980 that uses a lighter-than-air balloon 982 instead of wings to maintain altitude. Lighter-than-air balloon 982 may be filled with a lighter-than-air gas such as helium or hydrogen and may have a sufficient internal volume that it provides enough buoyancy to maintain communications relay aircraft 980 at high altitude (e.g. above 60,000 feet). Such a balloon may be similar to weather balloons used at high altitudes. Communications relay aircraft 980 is in communication with satellite 984 via laser communication 986. In this example, laser communication module 988 is provided to maintain laser communication 986. Communications relay aircraft 980 is also in communication with ground terminal 990 via RF communication 992. RF communication module 994 is provided to maintain RF communication 992. A conversion module 996 is located between laser communications module 988 and RF communications module 994 and is configured to convert laser (optical) communication received by laser communication module 988 for resending as RF communication by RF communication module 994 and to convert RF communication received by RF communication module 994 for resending as laser communication by laser communication module 988. While lighter-than-air and winged aircraft are shown, a communications platform may be maintained at a suitable altitude by any suitable means, and any suitable form of aircraft may be used as a communications relay aircraft including aircraft with rotors (helicopters, autogiros, etc.) rocket propelled aircraft or other aircraft.

Conversion of optical (e.g. laser) communication to RF communication and of RF communication to optical (e.g. laser) communication may be performed in various ways using various equipment. A laser signal may be received, demodulated, and the demodulated signal may be used to generate a modulated RF signal (with some intermediate data operations such as error correction in some cases). Similarly, an RF signal may be received, demodulated, and the demodulated signal may be used to generate a modulated laser signal (with some intermediate data operations in some cases). In another example, conversion between optical communication and RF communication is performed without demodulation and re-modulation. Relaying communication without demodulation and re-modulation reduces latency and may employ relatively simple circuits, which may be advantageous in a communications relay aircraft. Relaying laser communication (e.g. in a satellite) may also be performed without demodulation and re-modulation so that an incoming laser beam is redirected as an outgoing laser beam (with some amplification in some cases) without demodulation and modulation. Examples of circuits for relaying communications are provided below. It will be understood that many other circuits may also be used.

RF-to-Optical (Laser) Conversion

Examples illustrated in FIGS. 10A-D show how multiple RF communications may be received and converted into an optical communication, for example in a communications relay aircraft such as shown in any of FIGS. 6A-9 or otherwise. Multiple optical signals may also be combined with such RF communications. Such combination and conversion may be performed by a ground terminal that acts as a gateway by combining multiple communications to be communicated with a satellite network. Such combination and conversion may also be performed by a communications relay aircraft that receives one or more RF communications and combines them into an optical communication. In this situation, communication equipment on a communications relay aircraft may combine RF communications into an optical communication.

Figure 10A:
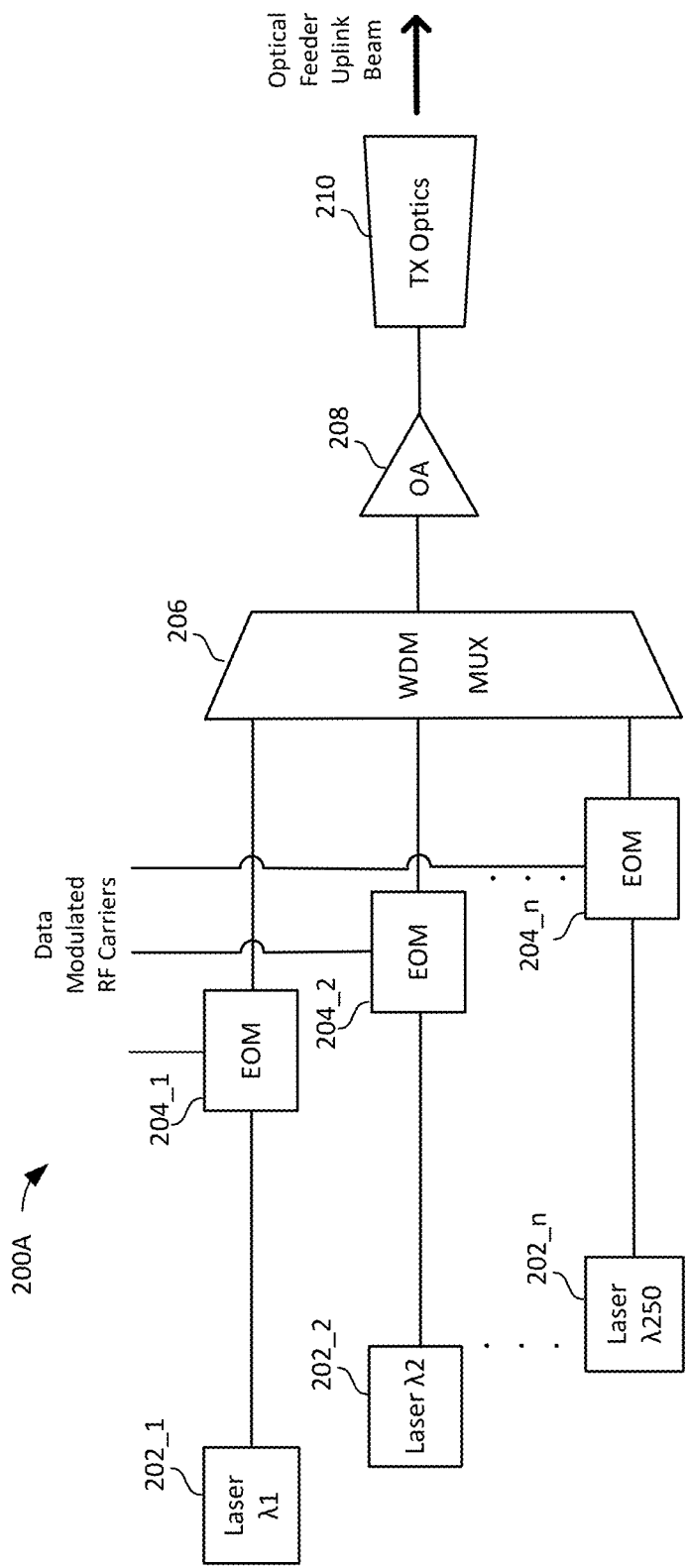
FIGS. 10A-D show examples of components used to convert RF communications to optical communications.

FIG. 10A will now be used to describe forward link subsystem 200A, according to an embodiment of the present technology. Such forward link equipment can also be referred to as an optical forward link subsystem 200A, or more generally, as an optical communication subsystem. Referring to FIG. 10A, the optical forward link subsystem 200A is shown as including n lasers 202_1 to 202_$n$, n electro-optical modulator (EOMs) 204_1 to 204_$n$, a wavelength-division multiplexing (WDM) multiplexer (MUX) 206, an optical amplifier (OA) 208 and transmitter optics 210. Each of these elements are described below.

The n separate lasers 202_1 to 202_$n$ each emit light of a different wavelength within a specified wavelength range that is for use in producing the optical feeder uplink beam (e.g. uplink 607$u$ of FIGS. 6A-B). The lasers can be referred to individually as a laser 202, or collectively as the lasers 202. The wavelength range from 1510 nm to 1560 nm, which is within the infrared (IR) spectrum, is practical to use because IR lasers for use in communications are readily available. However, wider or narrow wavelength ranges, within the same or other parts of the optical spectrum, may alternatively be used. For example, it would also be possible to utilize a wavelength range within the 400 nm-700 nm visible spectrum. It is also possible that the wavelength range that is specified for use in producing the optical feeder uplink beam (e.g., 607$u$) is non-contiguous. For example, the wavelength range that is for use in producing the optical feeder uplink beam can be from 1510 nm to 1534.8 nm and from 1540.2 nm to 1564.8 nm. Further, it is also possible that forward link subsystem 200A contains a number of lasers n that is one or two (e.g. n=1 or n=2) rather than the number n illustrated in FIG. 10A, which is at least 3. Where n=1, WDM MUX 206 is unnecessary and an EOM may be directly coupled to OA 208. Additionally, it is noted that forward link subsystem 200A may include two or more of each of the lasers (that each emit light of a different peak wavelength within a specified contiguous or non-contiguous wavelength range) to provide for redundancy or backup. Each of the lasers 202 can be, for example, a diode-pumped infrared neodymium laser, although the use of other types of lasers are also within the scope of the embodiments described herein.

To reduce and preferably avoid interference, the wavelength range that is for use in producing the optical feeder uplink beam (e.g., uplink 607$u$ above) should be different than the wavelength range that is for use in producing the optical feeder downlink beam (e.g., 607$d$). For example, if the wavelength range that is for use in producing the optical feeder uplink 607$u$ is from 1510 nm to 1560 nm, then the wavelength range that is for use in producing the optical feeder downlink 607$d$ can be from 1560.2 nm to 1575 nm. For another example, if the wavelength range that is for use in producing the optical feeder uplink 607$u$ is from 1510 nm to 1534.8 nm and from 1540.2 nm to 1564.8 nm, then the wavelength range that is for use in producing the optical feeder downlink 607$d$ can be from 1535 nm to 1540 nm and from 1565 nm to 1575 nm. These are just a few examples, which are not intended to be all encompassing.

Still referring to FIG. 10A, the light emitted by each of the n lasers 202, which can be referred to as an optical carrier signal, is provided (e.g., via a respective optical fiber) to a respective one of the n separate EOMs 204_1 to 204_$n$. The EOMs can be referred to individually as an EOM 204, or collectively as the EOMs 204. Each of the EOMs is an optical device in which a signal-controlled element exhibiting an electro-optic effect is used to modulate a respective beam of light. The modulation performed by the EOMs 204 may be imposed on the phase, frequency, amplitude, or polarization of a beam of light, or any combination thereof. In accordance with a specific embodiment, each of the EOMs 204 is a phase modulating EOM that is used as an amplitude modulator by using a Mach-Zehnder interferometer. In other words, each of the EOMs 204 can be implemented as a Mach-Zehnder modulator (MZM), which can be a Lithium Niobate Mach-Zehnder modulator, but is not limited thereto. In accordance with specific embodiments, each of the EOMs 204 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 204 can be referred to as an optical data signal. The modulation scheme that is implemented by the EOMs 204 can result in double- or vestigial-sidebands, including both an upper sideband (USB) and a lower sideband (LSB). Alternatively, single-sideband modulation (SSB) can be utilized to increase bandwidth and transmission power efficiency.

The n separate optical data signals that are output by the n EOMs 204 are provided to the WDM MUX 206, which can also be referred to as a dense wavelength division multiplexing (DWDM) MUX. The WDM MUX 206 multiplexes (i.e., combines) the n optical data signals, received from the n EOMs 204, onto a single optical fiber, with each of the n separate optical data signals being carried at the same time on its own separate optical wavelength within the range from 1510 nm to 1560 nm. For example, as explained above, the n separate optical data signals can have peak wavelengths of 1510 nm, 1510.2 nm, 1510.4 nm . . . 1559.8 nm and 1560 nm.

The signal that is output by the WDM MUX 206, which can be referred to as a wavelength division multiplexed optical signal, is provided to the optical amplifier (OA) 208. The OA 208 amplifies the wavelength division multiplexed optical signal so that the wavelength division multiplexed optical signal has sufficient power to enable transmission thereof from the ground to the satellite 100 in space. An exemplary type of OA 208 that can be used is an erbium-doped fiber amplifier (EDFA). However, embodiments of the present technology are not limited to use with an EDFA. The output of the OA 208 can be referred to as an optically amplified wavelength division multiplexed optical signal.

The optically amplified wavelength division multiplexed optical signal, which is output by the OA 208, is provided (e.g., via an optical fiber) to the transmitter optics 210. The transmitter optics 210, which can also be referred to as a telescope, or optical communication module, can include optical elements such as lenses, mirrors, reflectors, filters and/or the like. The transmitter optics 210 outputs a collimated optical feeder uplink beam that is aimed at a satellite. A gimbal, and/or the like, can be used to control the steering of the transmitter optics 210. In accordance with an embodiment, the collimated optical feeder uplink beam has an aperture of about 100 cm, and a half beam divergence of about 0.0000004 radians, wherein the term "about" as used herein means+/−10 percent of a specified value. The use of other apertures and half beam divergence values are also within the scope of the embodiments described herein. The collimated optical feeder uplink beam, which is output by the transmitter optics 210, is transmitted in free-space to receiver optics on a satellite. The term "free-space" means air, outer space, vacuum, or something similar (which is in contrast to using solids such as optical fiber cable, an optical waveguide or an optical transmission line). Reception and processing of the optical feeder uplink beam received at the satellite will be described in additional detail below. However, before describing the reception and processing of the optical feeder uplink beam received at the satellite, additional details of the forward link equipment, according to certain embodiments of the present technology, will first be provided.

Referring again to the EOMs 204, in accordance with certain embodiments of the present technology, each of the EOMs 204 modulates the optical signal it receives (e.g., via an optical fiber from a respective laser 202) with a separate RF signal that has already been modulated to include user data e.g. by a ground terminal. In order to eliminate the need for RF frequency down-converters in forward link equipment, the carrier frequencies of the RF signals that are used to modulate each of the n lasers 202 may correspond to the desired user downlink frequency band within the C band, Ku band, Ka band (or some other allotted band) that may be used to communicate between a communications relay aircraft and a ground terminal. Alternatively, RF frequency down-converters may be used in forward link equipment.

For example, a portion of the Ka band that may be desirable to use for can be from 17.7-20.2 GHz, and thus, includes a 2.5 GHz bandwidth. In such a case, each of the EOMs 204 could modulate the optical signal it receives (e.g., via an optical fiber from a respective laser 202) with a separate RF signal having a frequency within the range from 17.7-20.2 GHz.

For another example, a portion of the Ka band that may be desirable to use can be from 17.3-20.2 GHz, and thus, includes a 2.9 GHz bandwidth. In such a case, each of the EOMs 204 could modulate the optical signal it receives (e.g., via an optical fiber from a respective laser 202) with a separate RF signal having a frequency within the range from 17.3-20.2 GHz. Further, in an example where n=250, since each of the two hundred and fifty optical data signals (produced by the two hundred and fifty EOMs) has a bandwidth of 2.9 GHz, the bandwidth of the optical feeder uplink beam that is sent from the forward link system 200A on a communications relay aircraft to the satellite is 725 GHz (i.e., 2.9 GHz*250=725 GHz). While examples are described with respect to the Ka band, it will be understood that aspects of the present technology may be applied to any suitable band and that the present technology is not limited to any particular band.

Figure 10C:
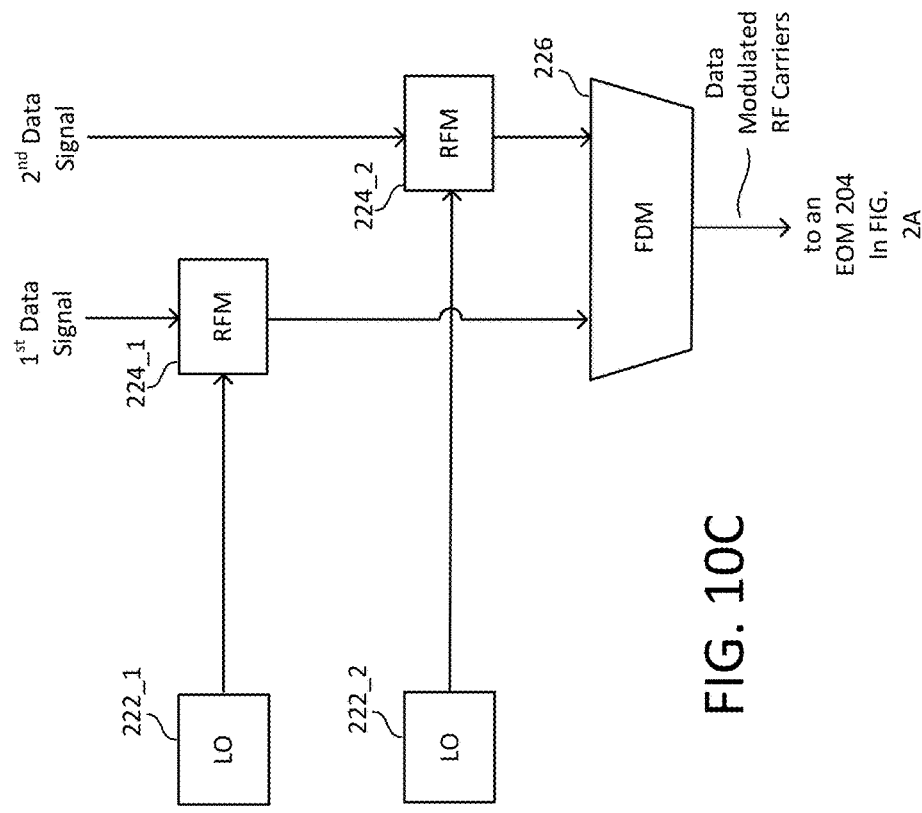
Figure 10B:
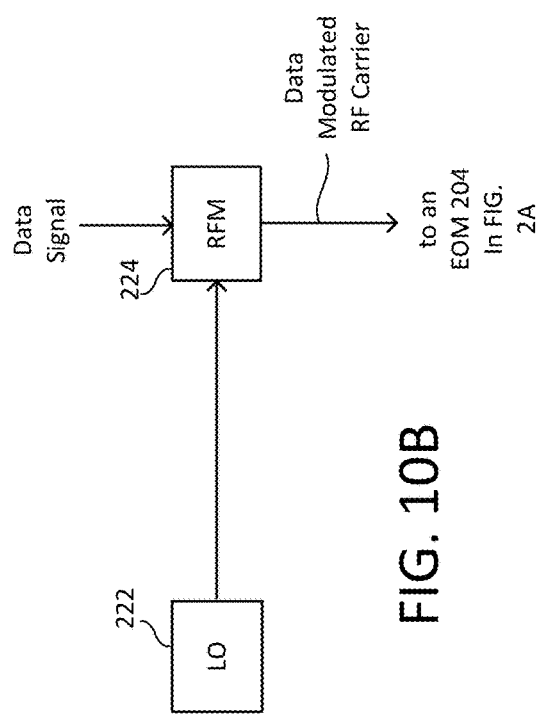

FIG. 10B depicts components that can be used to produce one of the data modulated RF carriers introduced in FIG. 10A, according to an embodiment of the present technology. The components shown in FIG. 10B would be useful where each of the optical data signals produced by each of the EOMs 204 carries the data for one service downlink beam (e.g., for one of the n service downlink beams). Referring to FIG. 10B, shown therein is a local oscillator (LO) 222 that produces an RF carrier signal within the portion of the Ka band that is available for transmitting service downlink beams (also referred to as downlink user beams). For example, the LO 222 may produce an RF carrier within the RF frequency range from 17.7-20.2 GHz (e.g., at 18.95 GHz, but not limited thereto). For another example, the LO 222 may produce an RF carrier within the RF frequency range from 17.3-20.2 GHz (e.g., at 18.75 GHz, but not limited thereto). The RF carrier signal that is output by the LO 222 is provided to an RF modulator (RFM) 224, which also receives a data signal, which may come from a receiver unit such as an RF receiver. The RFM 224 modulates that data signal onto the RF carrier signal to produce a data modulated RF carrier signal, which is provided to one of the EOMs 204 shown in FIG. 10A. Where n data modulated RF carrier signals are produced (each of which is provided to a different one of the EOMs 204), the components shown in FIG. 10B can be duplicated n times. Alternatively, the n RFMs 224 can receive the same carrier signal from a common LO 222, with each of the RFMs 224 receiving a separate data signal.

FIG. 10C depicts components that can be used to produce one of the data modulated RF carriers introduced in FIG. 10A, according to an alternative embodiment of the present technology. The components shown in FIG. 10C would be useful where each of the optical data signals produced by each of the EOMs 204 carries the data for two of the service downlink beams. Referring to FIG. 10C, shown therein is a first LO 222_1 and a second LO 222_2, a first RFM 224_1 and a second RFM 224_2, and a frequency division multiplexer (FDM) 226. The LO 222_1 and the LO 222_2 each produces a different RF carrier signal that may be within the portion of the Ka band that is available for transmitting service downlink beams (also referred to as downlink user beams). For example, the LO 222_1 may produce an RF carrier within the RF frequency range from 17.7-18.95 GHz (e.g., at 18.325 GHz, but not limited thereto), and the LO 222_2 may produce an RF carrier within the RF frequency range from 18.95-20.2 GHz (e.g., at 19.575, but not limited thereto). For another example, the LO 222_1 may produce an RF carrier within the RF frequency range from 17.3-18.75 GHz (e.g., at 18.025 GHz, but not limited thereto), and the LO 222_2 may produce an RF carrier within the RF frequency range from 18.75-20.2 GHz (e.g., at 19.475, but not limited thereto). The RFM 224_1 modulates a first data signal onto the RF carrier signal produced by the LO 222_1 to thereby produce a first data modulated RF carrier signal. The RFM 224_2 modulates a second data signal onto the RF carrier signal produced by the LO 222_2 to thereby produce a second data modulated RF carrier signal. The first and second data modulated RF carrier signals, which are produced by the RFMs 224_1 and 224_2, are provided to the FDM 226. The FDM 226 frequency multiplexes the first and second data modulated RF carrier signals, received from the two RFMs 224_1 and 224_2, onto a single carrier medium (e.g., cable, wire or trace), with each of the two data modulated RF carrier signals being carried at the same time at its own separate frequency sub-band. The output of the FDM 226 is provided to one of the EOMs 204 shown in FIG. 10A. Where n data modulated RF carrier signals are produced (each of which is provided to a different one of the EOMs 204), the components shown in FIG. 10C can be duplicated n times. Alternatively, n of the RFMs 224 can receive the same carrier signal from a common LO 222_1, and another n RFMs 224 can receive the same carrier signal from a common LO 222_2, with each of the RFMs 224 receiving a separate data signal. Other variations are also possible, and within the scope of an embodiment of the present technology.

The RFMs 224 can perform various different types of RF modulation, depending upon implementation and other factors such channel conditions. For example, the RFMs 224 can perform Amplitude-shift keying (ASK), Phase-shift keying (PSK), or Amplitude and phase-shift keying (APSK) types of modulation (e.g., 16-, 128- or 256-APSK), just to name a few. In accordance with certain embodiments, the modulation scheme performed by the RFMs 224 and EOMs 204 cause the signals that are transmitted from the system 200A (e.g. on a communications relay aircraft) to a satellite to be in conformance with the Digital Video Broadcasting-Satellite-Second Generation (DVB-S2) standard, or the related DVB-S2X standard (which is an extension of the DVB-S2 standard).

Referring again to FIG. 10A, in order to wavelength division multiplex n wavelengths produced by then lasers 202_1 to 202_*n*, a combination of C band optical frequencies (from 1530 nm to 1565 nm) and L band optical frequencies (from 1565 nm to 1625 nm) may be used, in order to reduce and preferably minimize inter-wavelength interference that may occur in an optical fiber due to non-linearities. If fewer wavelengths are used (e.g., at C band alone), and higher bandwidth is available at Ka band per user beam (e.g., if 2.9 GHz is available as it is in certain ITU Regions), the overall throughput may still remain of the order of several hundred GHz, which lets the capacity reach the Tb/s range. If instead each wavelength carries more than the Ka band user bandwidth, fewer wavelengths can be used, but some amount of frequency conversion would be needed in the space segment forward link equipment.

A data modulated RF carrier signal (including data for one service downlink beam) can be provided to one EOM 204, and the optical data signal output from that EOM 204 (and provided to the WDM MUX 206) can include data for the one service downlink beam, as can be appreciated from FIGS. 10A and 10B. Alternatively, two data modulated RF carrier signals (including data for two service downlink beams) can be provided to the same EOM 204, and the optical data signal output from that EOM 204 (and provided to the WDM MUX 206) can include data for the two service downlink beams, as can be appreciated from FIGS. 10A and 10C. In still other embodiments, two or more data modulated RF carrier signals (including data for the same service downlink beam) can be provided to one EOM 204, and the optical data signal output from the EOM 204 (and provided to the WDM MUX 206) can include data (of the two or more data modulated RF carrier signals) to be included in the one service downlink beam. Other variations are also possible, and within the scope of the embodiments disclosed herein.

Figure 10D:
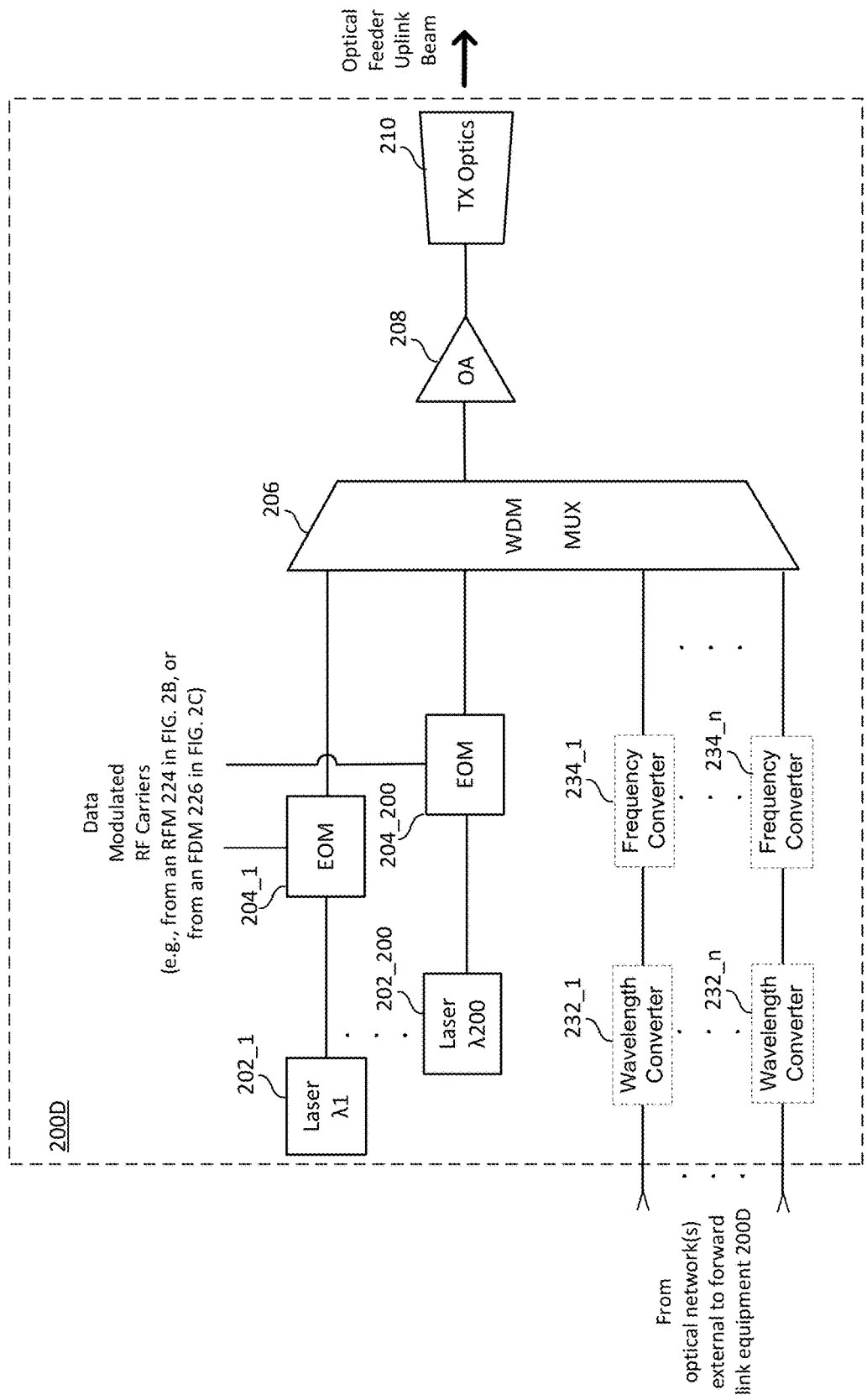

As noted above, in accordance with certain embodiments, one or more of the optical signals that is/are provided to the WDM MUX 206 may come from an optical network, such as, but not limited to, a local area network (LAN), metropolitan area network (MAN) or wide area network (WAN). In some cases, an input from an optical network may be a free-space optical input such as laser communication from a ground terminal to a communications relay aircraft. Such an optical network can be external to the forward link equipment. An example of such an embodiment is shown in FIG. 10D. More specifically, FIG. 10D depicts one or more optical networks, which are external to the forward link equipment 200D, providing optical signals to the forward link equipment 200D so that the data included in the optical signals (received from the external optical networks) can be included in the optical feeder uplink beam that is transmitted from the communications relay aircraft through free-space to a satellite. Although not specifically shown in FIG. 10D, each optical signal path that provides an optical signal from an optical network to the WDM MUX 206 may include a filter to remove unwanted frequencies and/or an optical amplifier (OA) to amplify the signal before it is provided to the WDM MUX 206. Exemplary details of such filters and OAs have been described herein, and thus, need not be repeated. Since each of the optical signals provided to the WDM MUX 206 should have a different optical wavelength, to enable wavelength divisional multiplexing to be performed, the optical signal received from the external optical networks should have an appropriate optical wavelength that differs from other wavelengths being provided to the WDM MUX 206, or alternatively, can be converted to an appropriate optical wavelength that differs from other wavelengths being provided to the WDM MUX 206. One or more optical wavelength converters, can be used to perform such wavelength conversions. The embodiments described with reference to FIG. 10D can provide enhanced end-to-end security, e.g., for military and/or other government data, because the forward link equipment 200D does not need any knowledge of the modulation and/or encryption schemes used on the optical signals that are being received from and/or forwarded to the optical network(s) that is/are external to link equipment 200D. Where a gateway is provided at a ground terminal, the gateway may connect to one or more optical networks where an optical network may be a fiber optic network. Where forward link equipment is provided in a communications relay aircraft, the equipment may connect to one or more optical networks that are free-space optical networks that operate between ground and the communications relay aircraft.

In accordance with certain embodiments, the forward link equipment 200D can optionally include wavelength converters 232, wherein each of the wavelength converters 232 is configured to convert a peak optical wavelength of one of the one or more optical data signals, received from the one or more optical networks that are external to forward link equipment 200D, to a different peak optical wavelength so that no two optical signals received at different inputs of the WDM MUX 206 have a same peak optical wavelength. For example, forward link equipment 200D may receive laser communication in addition to RF communication. Additionally, or alternatively, the forward link equipment 200D can optionally include one or more frequency converters 234, wherein each of the frequency converters 234 is configured to up-convert or down-convert a frequency of a different one of the optical signals being provided to the WDM MUX 206 (from one of the one or more optical networks that are external to the forward link equipment 200D), to thereby eliminate any need for frequency conversion at a subsequent point, for example by a communications relay aircraft. Wavelength conversion can be performed prior to the frequency conversion, as shown in FIG. 10D, or alternatively, frequency conversion can be performed prior to the wavelength conversion. For example, the relative positions of the wavelength converters 232 and the frequency converters 234 in FIG. 10D can be swapped.

Referring again to FIG. 10C, it is also possible that an FDM 226 receives more than two data modulated RF carrier signals, e.g., from more than two RFMs 224. This can enable, among other things, one service downlink beam to include more than two data modulated RF carriers.

Optical (Laser) to RF Conversion

Figure 11:
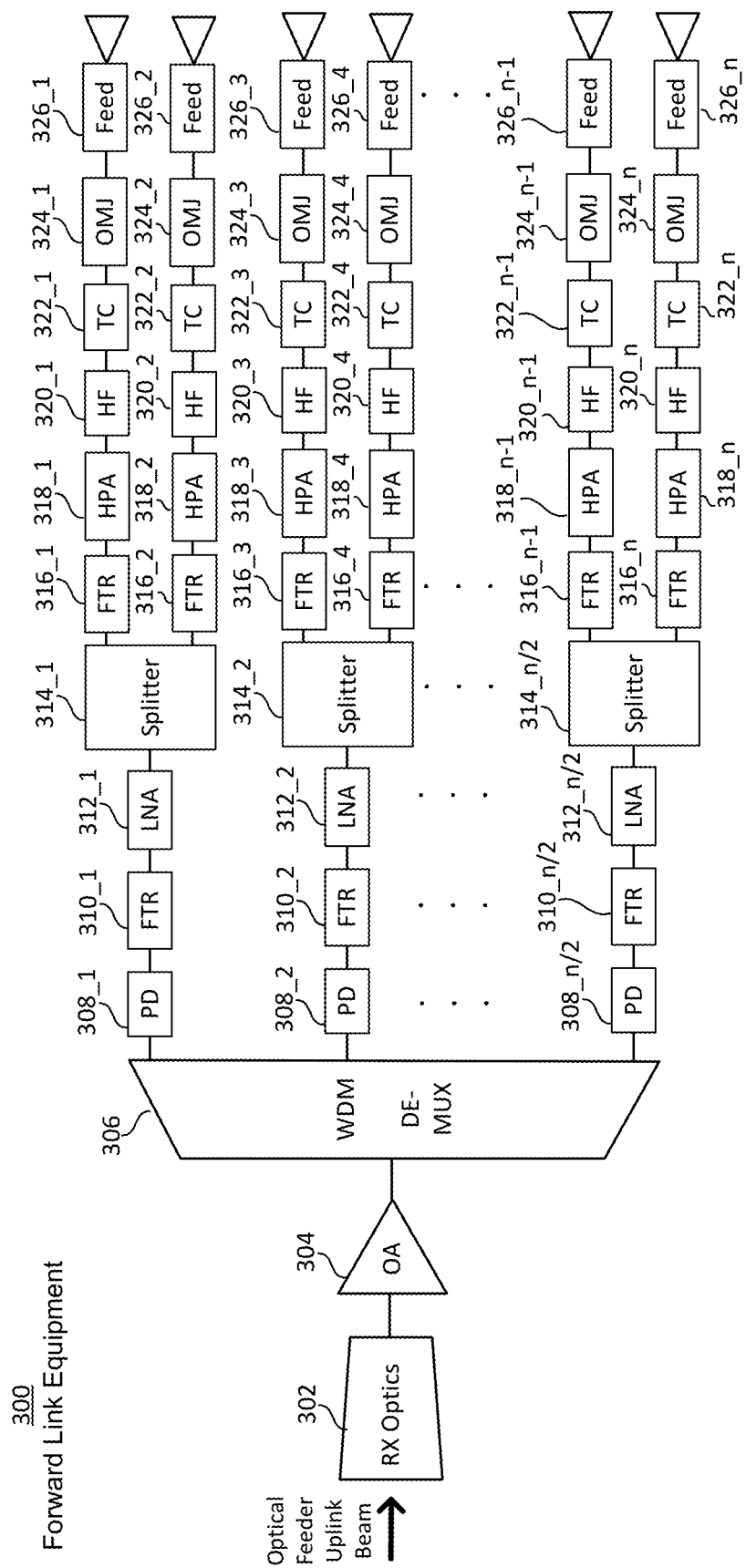
FIG. 11 shows an example of components used to convert optical communications to RF communications.

FIG. 11 will now be used to describe forward link equipment 300 according to an embodiment of the present technology. Forward link equipment 300, which can also be referred to as a forward link subsystem 300, or more generally, as an optical communication subsystem, is configured to receive the optical communication that is transmitted from a satellite or other source and convert it into one or more RF communications that are relayed to ground terminals. The forward link equipment 300 is also configured to convert an optical signal into electrical signals, and to produce service beams therefrom, wherein the service beams are for transmission from the satellite to service terminals STs. Such equipment may be located in a communications relay aircraft such as described above to connect a satellite using laser communication with ground terminals using RF communication. Forward link equipment 300 provides n service beams where n can be any number including a number fewer than the six or more service beams illustrated in FIG. 11 (e.g. n=1, 2, 3 . . . etc.).

Referring to FIG. 11, the forward link subsystem 300 is shown as including receiver optics 302, an optical amplifier (OA) 304, a wavelength-division multiplexing (WDM) demultiplexer (DEMUX) 306, n/2 photodetectors (PDs) 308_1 to 308_n/2, n/2 filters 310_1 to 310_n/2, n/2 low noise amplifiers (LNAs) 312_1 to 312_n/2, and n/2 splitters 314_1 to 314_n/2. The forward link subsystem 300 is also shown as including n filters 316_1 to 316_n, high power amplifiers (HPAs) 318_1 to 318_n, harmonic filters (HFs) 320_1 to 320_n, test couplers (TCs) 322_1 to 322_n, orthomode junctions (OMJs) 324_1 to 324_n, and feed horns 326_1 to 326_n. The PDs 308_1 to 308_n/2 can be referred to individually as a PD 308, or collectively as the PDs 308. The filters 310_1 to 310_n/2 can be referred to individually as a filter 310, or collectively as the filters 310. The LNAs 312_1 to 312_n/2 can be referred to individually as an LNA 312, or collectively as the LNAs 312. The filters 316_1 to 316_n can be referred to individually as a filter 316, or collectively as the filters 316. The HPAs 318_1 to 318_n can be referred to individually as an HPA 318, or collectively as the HPAs 318. The HFs 320_1 to 320_n can be referred to individually as an HF 320, or collectively as the HFs 320. The TCs 322_1 to 322_n can be referred to individually as a TC 322, or collectively as the TCs 322. The OMJs 324_1 to 324_n can be referred to individually as an OMJ 324, or collectively as the OMJs 324. The feed horns 326_1 to 326_n can be referred to individually as a feed horn 326, or collectively as the feed horns 326.

The receiver optics 302, which can also be referred to as a telescope, or an optical communications module or laser communications module, can includes optical elements such as mirrors, reflectors, filters and/or the like. The receiver optics 302 receives the optical beam that is transmitted by a satellite, and provides the received optical beam (e.g., via an optical fiber) to the OA 304. A gimbal, and/or the like, can be used to control the steering of the receiver optics 302 and a Global Positioning System (GPS) may also track positions of components in the system to control steering of the receiver optics 302 so that receiver optics 302 is directed towards a selected component. When the optical beam reaches a communications relay aircraft, the power of the optical beam may be significantly attenuated compared to when it was transmitted by a satellite. Accordingly, the OA 304 is used to amplify the received optical beam before it is provided to the WDM DEMUX 306. The OA 304 can be, e.g., an erbium-doped fiber amplifier (EDFA), but is not limited thereto. The output of the OA 304 can be referred to as an optically amplified received optical beam. The WDM DEMUX 306 demultiplexes (i.e., separates) the received optical beam (after it has been optically amplified) into n/2 separate optical signals, each of which is provided to a separate photodetector (PD) 308. Each PD 308 converts the optical signal it receives from the WDM DEMUX 306 to a respective RF electrical signal. The RF electrical signal produced by each PD 308 is provided to a respective filter (FTR) 310 (e.g., a bandpass filter) to remove unwanted frequency components and/or enhance desired frequency components. For an example, each filter 310 can pass frequencies within the range of 17.7-20.2 GHz, or within the range of 17.3-20.2 GHz, but are not limited thereto. The filtered RF electrical signal, which is output by each filter 310, is provided to a respective low noise amplifier (LNA) 312. Each LNA 312 amplifies the relatively low-power RF signal it receives from a respective filter 310 without significantly degrading the signals signal-to-noise ratio. The amplified RF signal that is output by each LNA 312 is provided to an optional respective splitter 314.

The splitter 314 splits the amplified RF signal it receives into two copies, each of which has half the power of the amplified RF signal that is provided to the input of the splitter 314. Each splitter 314 can be implemented by a hybrid, but is not limited thereto. In accordance with certain embodiments of the present technology, one of the RF signals that is output by a splitter 314 is used to produce one service beam, and the other RF signal that is output by the same splitter 314 is used to produce another service beam. Each of the copies of the RF signal that is output by the splitter 314 is provided to a respective filter 316. For example, the splitter 314_1 provides one copy of the RF signal it receives to the filter 316_1, and provides another copy of the RF signal it receives to the filter 316_2. In accordance with certain embodiments, the pair of filters 316 that receive RF signals from the same splitter 314 have pass bands that differ from one another. For example, the filter 316_1 may have a passband of 17.7-18.95 GHz and the filter 316_2 may have a passband of 18.95-20.2 GHz. For another example, the filter 316_1 may have a passband of 17.3-18.75 GHz and the filter 316_2 may have a passband of 18.75-20.2 GHz. This enables each splitter 314 and pair of filters 316, which are fed by the splitter 314, to separate a signal received by the splitter into two separate RF signals corresponding to two separate user beams. The use of other passbands is possible and within the scope of an embodiment of the present technology.

Each HPA 318 amplifies the RF signal it receives so that the RF signal has sufficient power to enable transmission thereof from the communications relay aircraft to a ground terminal, which may be at or near ground level, and may be covered by cloud. Each HPA 318 can be, e.g., a liner traveling wave tube high power amplifier, but is not limited thereto. The signal that is output by each of the HPAs 318 can be referred to as an amplified RF signal. Each HF 320 is used to reduce and preferably remove any distortion in the amplified RF signal that was caused by a respective HPA 318. Each HF 320 can be, e.g., an RLC circuit built from resistive (R), inductive (L) and capacitive (C) elements, but is not limited thereto. Each test coupler TC 322 can be used for power monitoring, payload testing and/or performing calibrations based on signals passing therethrough. Each OMJ 324 adds either right hand circular polarization (RHCP) or left hand circular polarization (LHCP) to the RF signal that is passed through the OMJ. This allows for color reuse frequency band allocation, wherein each color represents a unique combination of a frequency band and an antenna polarization. This way a pair of feeder beams that illuminate adjacent regions can utilize a same RF frequency band, so long as they have orthogonal polarizations. Alternatively, each OMJ 324 adds either horizontal linear polarization or vertical linear polarization to the RF signal that is passed through the OMJ. Each feed horn 326 converts the RF signal it receives, from a respective OMJ 324, to radio waves and feeds them to the rest of the antenna system (not shown) to focus the signal into a service downlink beam. A feed horn 326 and the rest of an antenna can be collectively referred to as the antenna. In other words, an antenna, as the term is used herein, can include a feed horn. All or some of the feed horns 326 can share a common reflector. Such reflector(s) is/are not shown in the Figures. The reflector and horn, or horns, may be considered to be, or to be part of, an RF communications module. While FIG. 11 shows an example where n is greater than one, forward link with n=1 may be similar to forward link equipment 300 but with a single signal pathway (e.g. without MUX 306, only one PD 308, FTR 310, and LNA 312, and without a splitter 314, only one FTR 316, HPA 318, HF 320, TC 322, OMJ 324, and feed 326).

Alternative RF-Optical Conversion

Figure 12:
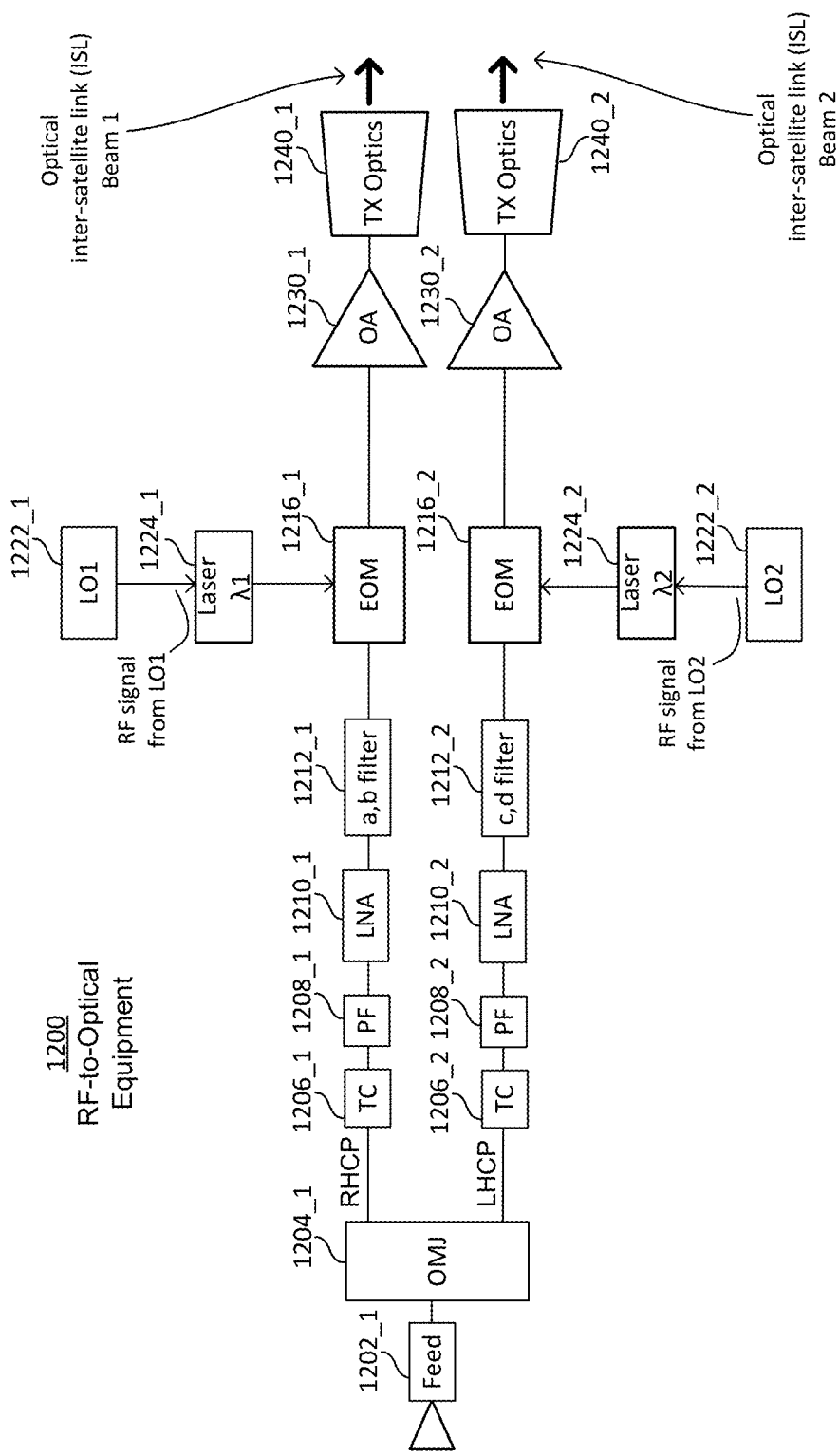
FIG. 12 shows an example of components for converting RF communications to optical communications.

FIG. 12 will now be used to describe a portion of equipment 1200 that may be carried by a communications relay aircraft (e.g. as described above in any one of FIGS. 6A-9), according to an embodiment of the present technology. Equipment 1200 receives RF communication and relays the data from the RF communication as optical (laser) communication. Such equipment 1200, which can also be referred to generally as a communication subsystem, is configured to receive an RF beam that is transmitted from a ground terminal, such as a ground based gateway, user terminal, subscriber terminal, or other ground based equipment to a communications relay aircraft that is carrying the equipment 1200, and produce and transmit an optical beam to a satellite.

Referring to FIG. 12, the equipment 1200 is shown as including a feed horn 1202_1, an OMJ 1204_1, TCs 1206_1 and 1206_2, PFs 1208_1 and 1208_2, LNAs 1210_1 and 1210_2, filters 1212_1 and 1212_2, EOMs 1216_1 and 1216_2, OAs 1230_1 and 1230_2 and transmitter optics 1240_1 and 1240_2. The equipment 1200 is also shown as including local oscillators 1222_1 (LO1) and 1222_2 (LO2), which output respective RF signals. Additionally, the equipment 1200 is shown as including lasers 1224_1 and 1224_2, each of which is operable to emit light having a respective different peak optical wavelength.

The feed horn 1202_1, along with a reflector (not shown in FIG. 12), gathers and focuses radio waves of an RF feeder uplink beam (e.g., 616u) and converts it to an RF signal that is provided to the OMJ 1204_1. The feed horn 1202_1 and the rest of the antenna can be collectively referred to as the antenna or antenna system and may be considered to be, or be part of, an RF module. An antenna, as the term is used herein, can include a feed horn. It is also possible that the antenna is a phased array or a lens antenna. The OMJ 1204_1 separates the RF signal into a right hand circular polarization (RHCP) RF signal and a left hand circular polarization (LHCP) RF signal. The OMJ 1204_1 can alternatively separate the RF signal it receives into a horizontal linear polarization RF signal and vertical linear polarization RF signal. Each of the TCs 1206_1 and 1206_2 can be used for power monitoring, payload testing and/or performing calibrations based on signals passing therethrough. Each of the PFs 1208_1 and 1208_2 (e.g., bandpass filters) can be used to remove unwanted frequency components and/or enhance desired frequency components. For an example, each of the PFs 1208_1 and 1208_2 can pass frequencies within the range of 29.5-30.0 GHz, but are not limited thereto. Each of the LNAs 1210_1 and 1210_2 amplifies the relatively low-power RF signal it receives from a respective one of the PFs 1208_1 and 1208_2 without significantly degrading the signals signal-to-noise ratio. The amplified RF signal that is output by each of the LNAs 1210_1 and 1210_2 is provided to a respective filter 1212_1 and 1212_2.

Each of the filters 1212_1 and 1212_2 allows frequencies to pass within two of the colors a, b, c and d. For example, the filter 1212_1 passes frequencies within the colors a and b, and the filter 412_2 passes the frequencies within the colors c and d. In accordance with an embodiment: color 'a' represents a first sub-band (e.g., 29.50-29.75 GHz) of an allocated uplink frequency band (e.g., 29.50-30.00 GHz) with a right-hand circular polarization (RHCP); color 'b' represents a second sub-band (29.75-30.00 GHz) of the allocated uplink frequency band with RHCP; color 'c' represents the first sub-band (e.g., 29.50-29.75 GHz) of the allocated uplink frequency band with a left-hand circular polarization (LHCP); and color 'd' represents the second sub-band (29.75-30.00 GHz) of the allocated uplink frequency band with LHCP. In other embodiments, the colors may include other allocations of the frequency band and polarization. For example, the polarizations can be horizontal and vertical linear polarizations, rather than RHCP and LHCP. The RF signals that are output from the filters 1212_1 and 1212_2, which can be referred to as data modulated RF signals, are provided to EOMs 1216_1 and 1216_2, as shown in FIG. 12A.

Still referring to FIG. 12, the local oscillators (LOs) 1222_1 and 1222_2 each produce a different RF carrier signal within the portion of the Ka band that is available. For example, the LO 1222_1 may produce an RF carrier within the RF frequency range from 17.7-18.95 GHz (e.g., at 18.325 GHz, but not limited thereto), and the LO 1222_2 may produce an RF carrier within the RF frequency range from 18.95-20.2 GHz (e.g., at 19.575, but not limited thereto). For another example, the LO 1222_1 may produce an RF carrier within the RF frequency range from 17.3-18.75 GHz (e.g., at 18.025 GHz, but not limited thereto), and the LO 1222_2 may produce an RF carrier within the RF frequency range from 18.75-20.2 GHz (e.g., at 19.475, but not limited thereto). The RF carrier signal produced by the LO 1222_1 is used to drive the laser 1224_1, and the RF carrier signal produced by the LO 1222_2 is used to drive the laser 1224_2. Each of the lasers 1224_1 and 1224_2 is operable to emit light of a different peak wavelength than the other in response to being driven by the RF carrier signal output by a respective one of the LOs 1222_1 and 1222_2. Infrared (IR), visible or other optical wavelengths can be produced by the lasers 1224_1 and 1224_2 and used for producing the optical ISL beams.

Still referring to FIG. 12, the light emitted by each of the lasers 1224_1 and 1224_2, which can be referred to as an optical carrier signal, is provided (e.g., via a respective optical fiber) to a respective one of the EOMs 1216_1 and 1216_2. Each of the EOMs 1216_1 and 1216_2 is an optical device in which a signal-controlled element exhibiting an electro-optic effect is used to modulate a respective beam of light. The EOM 1216_1 also receives the RF signal output by the filter 1212_1, and the EOM 1216_2 also receives the RF signal output by the filter 1212_2. The modulation performed by the EOMs 1216_1 and 1216_2 may be imposed on the phase, frequency, amplitude, or polarization of a beam of light, or any combination thereof. In accordance with a specific embodiment, each of the EOMs 1216_1 and 1216_2 is a phase modulating EOM that is used as an amplitude modulator by using a Mach-Zehnder interferometer. In other words, each of the EOMs 1216_1 and 1216_2 can be implemented as a Mach-Zehnder modulator (MZM), which can be a Lithium Niobate Mach-Zehnder modulator, but is not limited thereto. In accordance with specific embodiments, each of the EOMs 1216_1 and 1216_2 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 1216_1 and 1216_2 can be referred to as an optical data signal. The modulation scheme that is implemented by the EOMs 1216_1 and 1216_2 can result in double- or vestigial-sidebands, including both an upper sideband (USB) and a lower sideband (LSB). Alternatively, single-sideband modulation (SSB) can be utilized to increase bandwidth and transmission power efficiency. An EOM may be considered to be, or be part of, a conversion module that converts an RF signal to an optical signal.

Explained another way, each of the EOMs 1216_1 and 1216_2 is configured to receive an LO modulated optical carrier signal from a respective one of the lasers 1224_1 and 1224_2 and receive a different data modulated RF signal including data (e.g., corresponding to at least one of a plurality of RF service downlink beams). Additionally, each of the EOMs 1216_1 and 1216_2 is configured to output an optical data signal carrying data and including the LO frequency signal required to generate a frequency converted RF signal (e.g., corresponding to at least one of a plurality of RF service downlink beams) and having an RF frequency within the same specified RF frequency range within which another satellite, to which an optical beam (that will be output by the transmitter optics 1240) is being transmitted, is configured to transmit a plurality of RF service downlink beams.

Outputs of EOMs 1216_1 and 1216_2 are provided to OAs 1230_1 and 1230_2 respectively. The OAs 1230_1 and 1230_2 amplify the optical signals so that the optical signals have sufficient power to enable transmission thereof from a communications relay aircraft to a satellite in space. The OAs 1230_1 and 1230_2 can be an erbium-doped fiber amplifiers (EDFA), but are not limited thereto. The outputs of the OAs 1230_1 and 1230_2 can be referred to as optically amplified optical signals.

The optically amplified wavelength division multiplexed optical signals, which are output by the OAs 1230_1 and 1230_2, are provided (e.g., via an optical fiber) to the transmitter optics 1240_1 1240_2. The transmitter optics 1240_1 and 1240_2, which can also be referred to as telescopes, can includes optical elements such as lenses, mirrors, reflectors, filters and/or the like. The transmitter optics 1240_1 and 1240_2 output collimated optical beams that are aimed at one or more satellites (e.g. two beams aimed at the same satellite, or two different satellites). The transmitter optics 1240_1 and 1240_2 may be considered to be, or be a part of, an optical communications module. A gimbal, and/or the like, can be used to control the steering of the transmitter optics 1240_1 and 1240_2 and a GPS unit can provide location information about the satellite, and other satellites in the constellation (or other components) so that optics 1240_1 and 1240_2 may be directed to the location of a satellite (or other components, such as ground stations, or communications relay aircraft). The diameter of the transmitter optics 1240_1 and 1240_2 can depend on the distance to a satellite and whether the optical beam terminates in the adjacent satellite or if it continues on to another satellite. The diameter of the transmitter optics 1240_1 and 1240_2 can nominally range from about 5 to 15 cm. If the optical beam continues on to adjacent satellites the diameter may need to be bigger in order to account for compiling SNR from traversing multiple links.

Optical-to-Optical Relay

Figure 13:
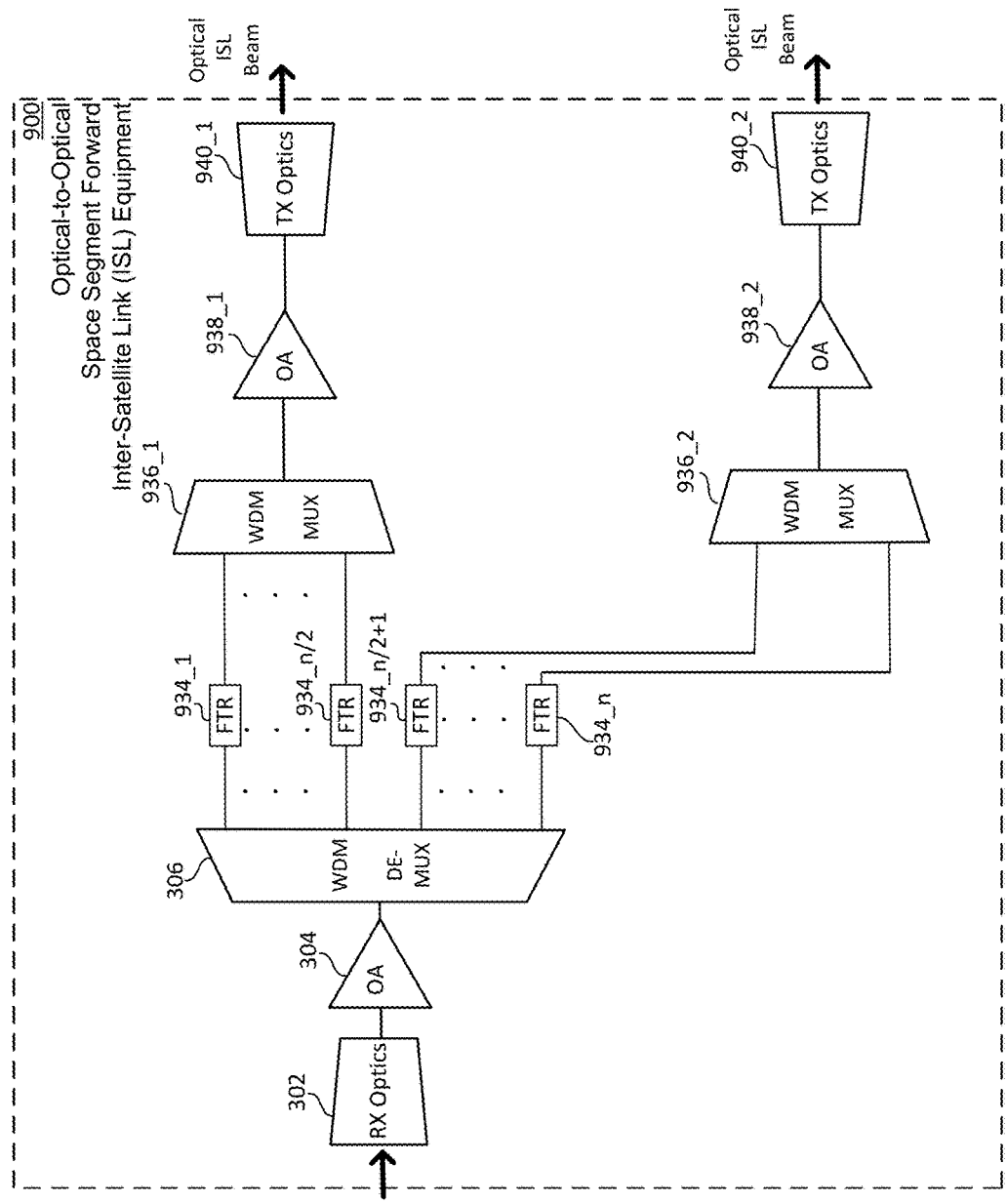
FIG. 13 shows an example of components for relaying optical communications.

FIG. 13 will now be used to describe a portion of space segment forward inter-satellite link (ISL) equipment, or ISL equipment 900, according to an embodiment of the present technology. Such ISL equipment 900, which can also be referred to as an ISL subsystem 900, or more generally, as an optical communication subsystem, can be configured to receive an optical feeder uplink beam that is transmitted from a ground based optical gateway subsystem, or a communications relay aircraft, to the satellite that is carrying the space segment forward ISL equipment 900. Alternatively, or additionally, the space segment forward ISL equipment 900 can be configured to receive an optical ISL beam that is transmitted from another satellite. The space segment forward ISL equipment 900 can also configured to act as an optical repeater to pass on an optical beam (or a portion thereof) that it receives (from a ground terminal, communications relay aircraft, or from another satellite) to a further satellite as an optical ISL beam. In some cases, ISL equipment such as ISL equipment 900 may be provided in a communications relay aircraft to allow the aircraft to relay optical communications (e.g. between satellites, between ground stations and satellites, or between different ground stations).

The receiver optics 302 (which can include optical elements such as mirrors, reflectors, filters and/or the like) can receive an optical feeder uplink beam that is transmitted through free-space to the satellite by a ground terminal or a communications relay aircraft, provides the received optical feeder uplink beam (e.g., via an optical fiber) to the OA 304. A gimbal, and/or the like, can be used to control the steering of the receiver optics 302 in conjunction with location information from a GPS unit. When the optical feeder uplink beam reaches the satellite, the power of the optical feeder uplink beam is significantly attenuated compared to when it was transmitted. Accordingly, the OA 304 is used to amplify the received optical feeder uplink beam before it is provided to the WDM DEMUX 306. The OA 304 can be, e.g., an erbium-doped fiber amplifier (EDFA), but is not limited thereto. The output of the OA 304 can be referred to as an optically amplified received optical feeder uplink signal.

The same receiver optics 302, or another instance of the receiver optics, can receive an optical ISL beam that is transmitted by another satellite through free-space to the satellite and provides the received optical ISL beam (e.g., via an optical fiber) to the OA 304, or another instance of the OA. When an optical ISL beam that originated from another satellite reaches the satellite, the power of the optical ISL beam is significantly attenuated compared to when it was transmitted by the other satellite. Accordingly, the OA 304 can be used to amplify the received optical ISL beam before it is provided to the WDM DEMUX 306. In this case, the output of the OA 304 can be referred to as an optically amplified received optical ISL signal.

The WDM DEMUX 306 demultiplexes (i.e., separates) the received optical feeder uplink beam (or the received optical ISL beam), after it has been optically amplified, into n separate optical data signals, each of which has a different peak optical wavelength, and each of which is provided to a separate optical filter (FTR) 934.

The n/2 signals that are provided by the n/2 filters 934_1-934_n/2 are multiplexed (i.e., combined) by the WDM MUX 936_1 onto a single optical fiber, with each of the n/2 optical data signals being carried at the same time on its own separate optical wavelength within a specified contiguous wavelength range (e.g., from 1510 nm to 1560 nm) or a specified non-contiguous wavelength range (e.g., from 1510 nm to 1534.8 nm and from 1540.2 nm to 1564.8 nm). However, wider or narrow wavelength ranges, within the infrared or other parts of the optical spectrum, may alternatively be used. For example, it would also be possible to utilize a contiguous or non-contiguous wavelength range within the 400 nm-700 nm visible spectrum.

The OA 938_1 amplifies the wavelength division multiplexed optical signal so that the wavelength division multiplexed optical signal has sufficient power to enable transmission thereof from the satellite in free-space to another satellite or to a communications relay aircraft or other recipient. The OA 938_1 can be an erbium-doped fiber amplifier (EDFA), but is not limited thereto. The output of the OA 938_1 can be referred to as an optically amplified wavelength division multiplexed optical ISL signal.

The optically amplified wavelength division multiplexed optical ISL signal, which is output by the OA 938_1, is provided (e.g., via an optical fiber) to the transmitter optics 940_1. The transmitter optics 940_1, which can also be referred to as a telescope or optical communication module, can include optical elements such as lenses, mirrors, reflectors, filters and/or the like. The transmitter optics 940_1 outputs a collimated optical ISL beam that is aimed at a recipient such as another satellite. A gimbal, and/or the like, can be used to control the steering of the transmitter optics 940. In accordance with an embodiment, the collimated optical ISL beam has an aperture of about 40 cm, and a half beam divergence of about 0.0000012 radians, wherein the term "about" as used herein means+/−10 percent of a specified value. The use of other apertures and half beam divergence values are also within the scope of the embodiments described herein. The collimated optical ISL beam, which is output by the transmitter optics 940, is transmitted in free-space to receiver optics of another satellite.

The n/2 data signals that are provided by the n/2 filters 934_n/2+1-934_n are multiplexed (i.e., combined) by the WDM MUX 936_2 onto a single optical fiber, with each of the n/2 optical data signals being carried at the same time on its own separate optical wavelength within a specified contiguous wavelength range (e.g., from 1510 nm to 1560 nm) or a specified non-contiguous wavelength range (e.g., from 1510 nm to 1534.8 nm and from 1540.2 nm to 1564.8 nm). However, wider or narrow wavelength ranges, within the infrared or other parts of the optical spectrum, may alternatively be used. For example, it would also be possible to utilize a contiguous or non-contiguous wavelength range within the 400 nm-700 nm visible spectrum.

The OA 938_2 amplifies the wavelength division multiplexed optical signal so that the wavelength division multiplexed optical signal has sufficient power to enable transmission thereof from the satellite in free-space to another satellite. The OA 938_2 can be an erbium-doped fiber amplifier (EDFA), but is not limited thereto. The output of the OA 938_2 can be referred to as an optically amplified wavelength division multiplexed optical ISL signal.

The optically amplified wavelength division multiplexed optical ISL signal, which is output by the OA 938_2, is provided (e.g., via an optical fiber) to the transmitter optics 940_2. The transmitter optics 940_2, which can also be referred to as a telescope or optical communication module, can includes optical elements such as lenses, mirrors, reflectors, filters and/or the like. The transmitter optics 940_2 outputs a collimated optical ISL beam that is aimed at a recipient such as another satellite. A gimbal, and/or the like, can be used to control the steering of the transmitter optics 940. In accordance with an embodiment, the collimated optical ISL beam has an aperture of about 40 cm, and a half beam divergence of about 0.0000012 radians, wherein the term "about" as used herein means+/−10 percent of a specified value. The use of other apertures and half beam divergence values are also within the scope of the embodiments described herein. The collimated optical ISL beam, which is output by the transmitter optics 940, is transmitted in free-space to receiver optics of another satellite.

ISL equipment receives an optical communication via receiver optics 302 and provides two optical communications as outputs from transmitter optics 940_1 and 940_2. Each of these outputs includes n/2 of n individual data signals that were received in the optical communication. In other examples, data signals may be demultiplexed and multiplexed differently. For example, one output may represent from 1 to more than 250 individual data signals and more than two outputs may be provided. Optical ISL beams may be sent to different satellites in a constellation so that incoming traffic that is received from a single satellite may be divided and relayed to multiple different satellites or other recipients, e.g. according to final destination. Similarly, individual data streams from two or more satellites along two or more incoming optical beams may be combined in a single output beam.

In some cases, an optical signal such as a laser signal, may be received at a first frequency and may be transmitted at a different frequency without being demodulated and re-modulated. While the example of FIG. 13 does not show frequency conversion, in other examples, some frequency conversion may be provided. For example, a laser frequency doubler may act as an upconverter to double the frequency of a received signal (e.g. transmitted frequency is twice the received frequency). A laser frequency doubler may use a ring resonator (e.g. a monolithic ring resonator of $KNbO_3$), crystals of ammonium dihydrogen phosphate, or other suitable components to double the frequency of a received signal. A frequency divider may act as a downconverter to divide the frequency of a received signal (e.g. the transmitted frequency is half the received frequency). A laser frequency upconverter or downconverter may be based on the Stark effect, which enables the frequency of radiation emitted by a quantum transition (e.g. in a laser) to be altered by applying an electric field.

Figure 14A:
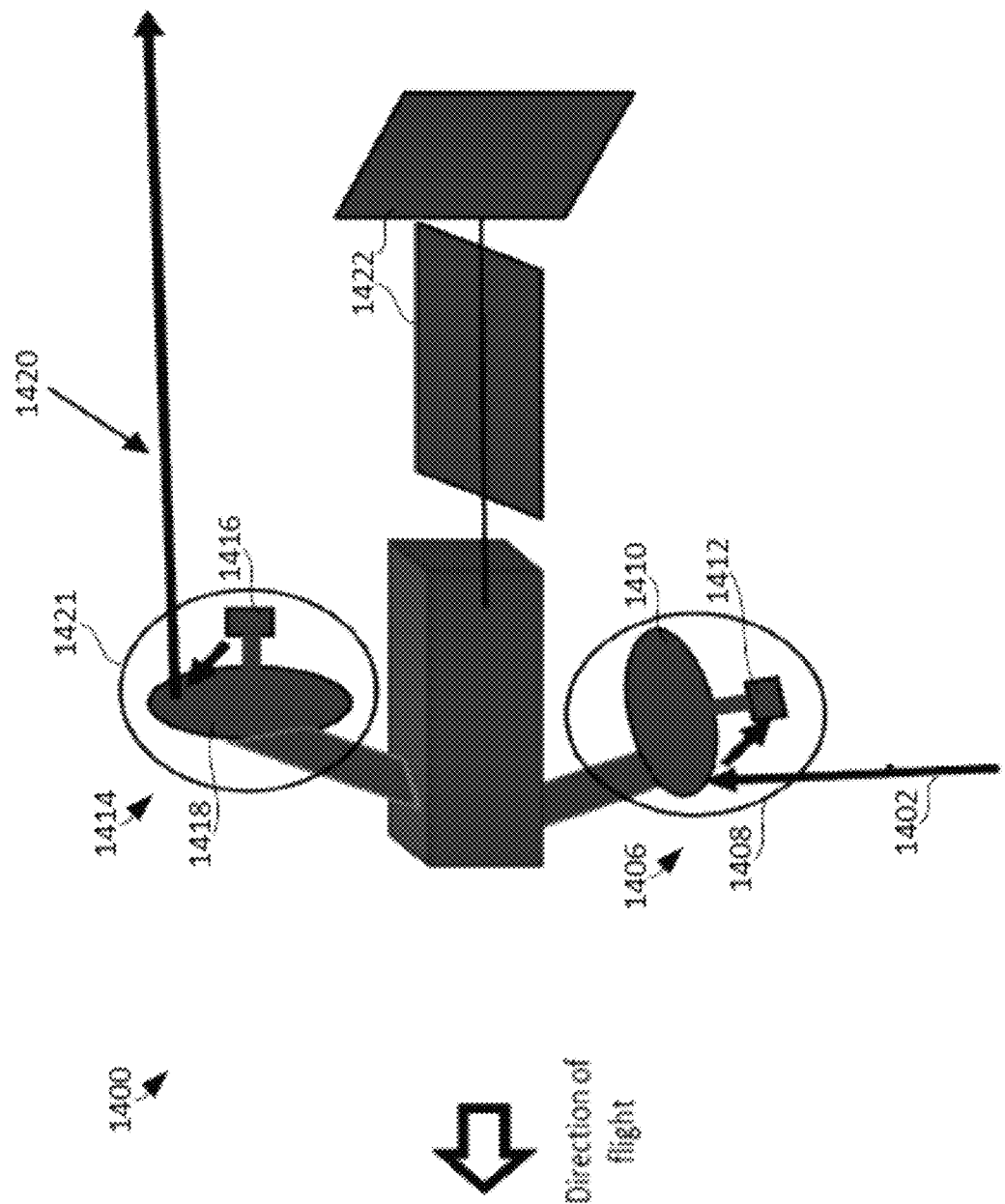
FIGS. 14A-B show an example of a satellite for relaying optical communications.

FIG. 14A illustrates an example of a satellite 1400 that may be used in a communications system, for example as one satellite in a satellite constellation that uses optical ISLs to relay data from satellite-to-satellite through the constellation and to ground terminals. A laser beam 1402 (laser uplink) is received by a receiving module 1406, for example, from a communications relay aircraft or ground terminal. Receiving module 1406 includes a transparent cover 1408 that encloses a parabolic mirror 1410. Transparent cover 1408 is transparent at least at the wavelength of laser beam 1402 (which may, or may not, be in the visible spectrum) and may be spherical in shape to reduce drag and ensure that drag remains constant regardless of the orientation of parabolic mirror 1410. Parabolic mirror 1410 reflects laser beam 1402 onto a feed 1412, which may be an optical receiver such as an end of an optical fiber. The feed provides an optical signal to internal components of satellite 1400 (not shown in FIG. 14) where it may be amplified and sent to a transmitting module 1414 to be sent to another satellite. Transmitting module 1414 includes a feed 1416, which may be the end of an optical fiber. Laser light coming from feed 1416 is reflected by parabolic mirror 1418 so that it is directed to another satellite as laser beam 1420. Transmitting module 1414 includes a transparent cover 1421, which is similar to transparent cover 1408. In some cases, transmitting and receiving modules may be interchangeable so that a module may be a transmitting module at some times and may be a receiving module at other times. Receiving module 1406 and transmitting module 1414 are linked so that they relay an incoming laser communication as an outgoing laser communication that may be identical to the incoming laser communication (i.e. the data bits are unchanged) but is sent in a different direction. While only receiving module 1406 and transmitting module 1414 are shown, another pair of modules may provide laser communication in an opposite direction (i.e. a laser downlink from satellite 1400 in addition to laser uplink, and communication coming from the same satellite that receives laser beam 1420. Thus, for two-way communication to be relayed, two transmitter-receiver pairs may be provided. Additional transmitter-receiver pairs may be provided to allow a satellite to relay multiple communications to and from multiple other components.

Locating and orienting modules may be provided to allow satellite 1400 to locate other components (e.g. other satellites, ground terminals, and communications relay aircraft). For example, a laser beacon may allow another satellite to "see" where the satellite is located and additional optical components (e.g. telescopes) may search for laser beacons of other satellites. Global Positioning System (GPS) units may be used to provide location information that is shared with other components in the communication system (including satellites, ground terminals, and communications relay aircraft) so that an orientation module can orient a telescope to search for a beacon in the right area. Positions of some or all other components (e.g. satellites, ground terminals, and communications relay aircraft) may be known to a given component so that it can identify nearby components for establishing communication and search for the components in the right locations. Similarly, a beacon laser may be oriented according to a known GPS location of a system component so that it is visible to the component. Once a beacon laser is found, main communication lasers on both sides may be aligned accordingly to establish two-way laser communication.

In some cases, where laser communication is relayed without being demodulated, a separate laser communication may provide routing information and/or other information. In some cases, a beacon laser may be combined with such a routing laser so that the beacon laser provides a separate communication channel. For example, a beacon laser may be found and communication may be established between satellites in a handshaking routine in which satellites confirm identity and exchange some basic information using the beacon laser. Routing information may also be passed along in this way so that demodulation is unnecessary. For example, destination address information may be passed from satellite to satellite through beacon laser communication which is separate from the lasers used for transmitting the data payload. In this way, the payload does not require demodulation and the payload beam may pass from satellite to satellite without delays that might result from demodulating address information and routing accordingly. A beacon laser may be generated within a satellite in some cases, or it may be generated elsewhere and may be modulated and redirected by a satellite.

Satellite 1400 may be an aerodynamic glider type satellite that does not include any propulsion mechanism. Satellite 1400 is adapted for low earth orbit where flaps 1422 provide sufficient drag to steer satellite 1400 when they are oriented appropriately (i.e. flaps 1422 act as control surfaces). Such a satellite may have an orbit that decays in altitude during its mission life (e.g. over ten years). This altitude decay rate is modulated to enable orbital speed to be controlled so each spacecraft retains the same position with respect to its sisters, or moves to a new position to replace a failed unit. The failed unit either tumbles or deploys a parachute to drop out of the formation and re-enter the atmosphere in a timely fashion. The control surfaces are also manipulated to provide attitude control in a fashion similar to that of an aircraft.

Figure 14B:
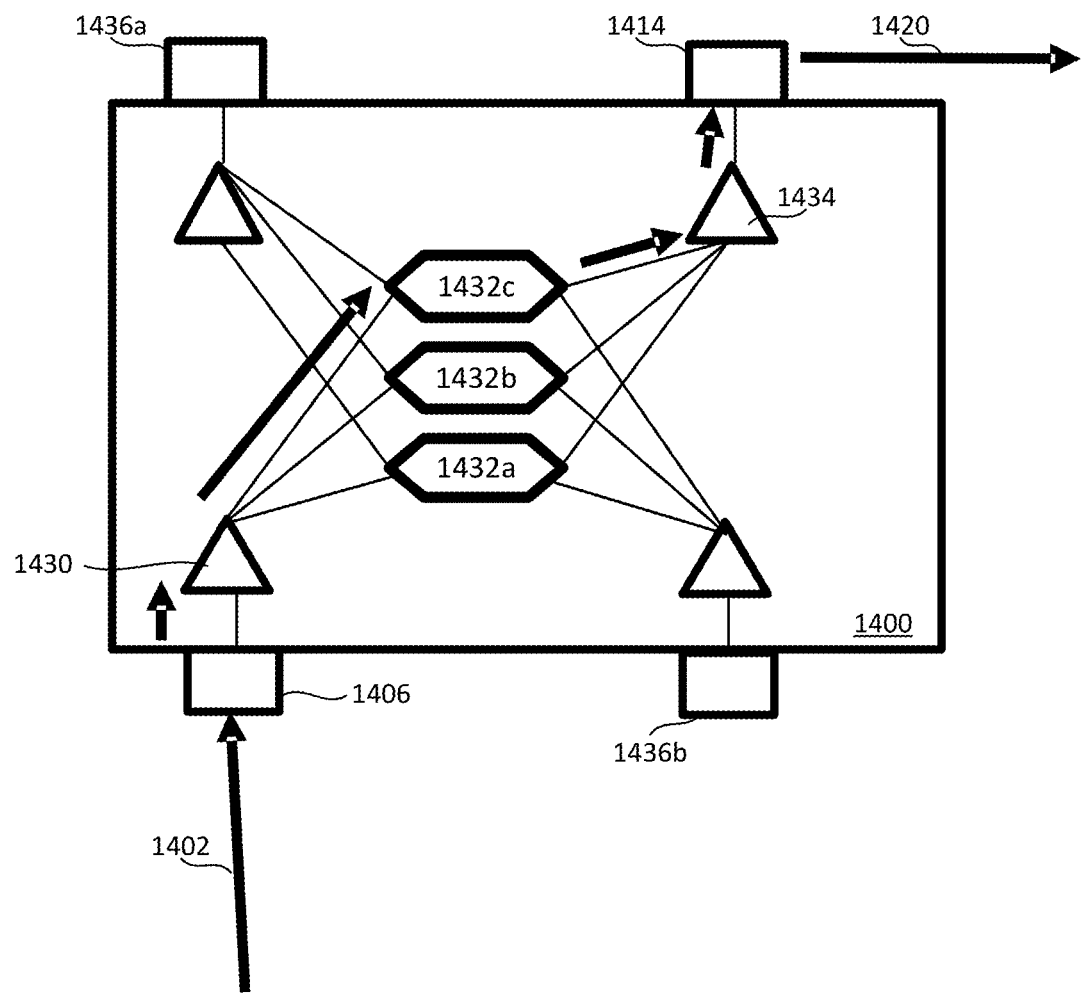
Figure 14B:
Figure 14B:
Figure 14B:

FIG. 14B is a schematic illustration of how laser communication may be routed internally in satellite 1400 without demodulation. Incoming laser beam 1402 is received by receiving module 1406 and is sent (e.g. along an optical fiber) to a first optical switch 1430. Optical switch may be an electro-optic, magneto-optic, or other optical switch that selectively connects an input to one of the outputs. First optical switch 1430 directs laser beam 1402 to one of three optical amplifiers 1432*a-c*, which may be any suitable optical amplifier such as a pumped fiber optic laser amplifier so that demodulation and re-modulation of an optical signal is not required. For example, as shown by the arrow in FIG. 14B, laser beam 1402 is sent to optical amplifier 1432*c* where it is amplified. From optical amplifier 1432*c*, laser beam 1402 goes through switch 1434 to transmitting module 1414 where it is transmitted to another satellite as laser beam 1420. Thus, it can be seen that laser beam 1420 is simply laser beam 1402 that has been amplified and redirected. The data bits encoded in this laser beam remain the same and no demodulation or modulation occurs. While no frequency modification occurs in satellite 1400 (i.e. laser beam 1420 and laser beam 1402 are at the same frequency), in other examples a transmitted laser beam such as laser beam 1420 may be at a different frequency to a corresponding received laser beam such as laser beam 1402. One or more laser frequency upconverters and/or downconverters (e.g. doublers, dividers, or similar components) may be provided in a satellite to change frequency of a laser signal without demodulation and re-modulation. FIG. 14B shows additional transmitting and receiving modules 1436*a-b* (not shown in FIG. 14A), which may be connected through optical switches and an optical amplifier in a similar manner. Additional transmitting and receiving modules (not shown) may be provided. Optical amplifiers may be selected as needed by connecting a selected amplifier to a desired receiving module and transmitting module through corresponding switches.

A constellation of spacecraft in low-altitude orbit can deliver communications with a shorter light-time delay than a terrestrial fiber-optic cable despite the slightly greater path length for the spacecraft system where satellites are at low altitude and where latency is small. For example, New York to Hong Kong light-time delay through a spacecraft constellation can be as low as 49 milliseconds while the New York to Hong Kong light-time delay for the fiber optic cable would be 67 milliseconds. Examples above employ RF to penetrate clouds in the uplinks and downlinks, also laser beams for the cross-links between spacecraft. Path lengths may be only about 500 km where spacecraft altitude may be about 450 km and the number of spacecraft is on the order of 10,000. The laser beams may be relayed through multiple spacecraft to reach a spacecraft directly, or nearly directly, above the destination using steerable mirrors to avoid processing delays. An alternate embodiment covers a clear-skies mode in which a laser beam is either generated by or received by a ground site directly to a satellite without the involvement of a communications relay aircraft.

Certain embodiments of the present technology are directed to a satellite communications system. In accordance with an embodiment, the satellite communications system includes: two or more satellites in communication with each other using configured for laser communications; and a communications relay aircraft adapted for flying at altitudes above clouds. In accordance with an embodiment he communications relay aircraft includes: a laser communications module to communicate with the satellite using laser communication; a Radio Frequency (RF) communications module to communicate with equipment at or near ground level using cloud-penetrating RF communications; wherein the RF communications module is configured to take first data received as laser communication by the laser communications module and to generate a corresponding RF transmission containing the first data; and wherein the laser communications module is configured to take second data received as RF communication by the RF communications module and to generate a corresponding laser transmission containing the second data.

The satellite may be configured for orbiting the Earth in Low Earth Orbit (LEO). The satellite communications system may also include a plurality of ground terminals at or near ground level, a first ground terminal configured to communicate with the communications relay aircraft using cloud-penetrating RF communications and configured to communicate with a second ground terminal by communication relayed through the communications relay aircraft and further relayed through the satellite. The communications relay aircraft may generate a laser signal corresponding to an RF signal received from the first ground terminal, the laser signal amplified by the one or more satellites through which the laser signal is relayed. The first ground terminal may be further configured to communicate directly with the satellite using laser communication. The first ground terminal may be further configured to select a communication path for communication between the first ground terminal and the satellite according to communication speeds. The communications relay may be adapted for flying at altitudes above 60,000 feet. The satellite may include one or more laser communication modules for communicating with one or more satellites, communications relay, or ground terminals.

Certain embodiments of the present technology are directed to a communications relay aircraft that includes: an optical communications module directed upward of the communications relay aircraft for communicating with a satellite; a radio frequency (RF) communications module directed downward of the communications relay aircraft; and a conversion module connected between the optical communications module and the RF communications module, the conversion module configured to convert optical communication received by the optical communications module for resending as RF communication by the RF communications module and to convert RF communication received by the RF communications module for resending as optical communication by the optical communications module.

The communications relay aircraft may also include a fuselage; one or more jet engines; and wings extending horizontally from the fuselage, the wings having airfoil cross-sectional shapes, the wings configured to provide sufficient lift to maintain the communications relay aircraft at a height of more than 60,000 feet when propelled by the one or more jet engines. The communications relay aircraft may also include a balloon having an internal volume such that the balloon filled with a lighter-than-air gas generates sufficient buoyancy to maintain the communications relay aircraft at a height of more than 60,000 feet. The communications relay aircraft may be a pilotless aircraft. The optical communications module may include an orientation unit configured to direct optical communications toward a selected satellite. The orientation unit may be configured to direct optical communications toward a selected satellite of a plurality of satellites in low earth orbit at a distance of between 400 km and 1800 km above the surface of the earth. The orientation unit may include a global positioning system (GPS) unit configured to determine a current location of the communications relay aircraft and current locations of the plurality of satellites. The conversion module may include: a laser source; an electro-optical modulator (EOM); a photodetector; and an amplifier.

Certain embodiments of the present technology are directed to a satellite communications system, including: a satellite constellation that includes a plurality of satellites in low earth orbit, the plurality of satellites configured for inter-satellite laser communication and for satellite-to-ground laser communication; a plurality of ground terminals at or near the earth's surface; and a communications relay aircraft configured to receive data from the satellite constellation using laser communication and to relay the data to a ground terminal using RF communication.

The communications relay aircraft may be further configured to receive additional data from the ground terminal using RF communication and to relay the additional data to the satellite constellation using laser communication. The communications relay aircraft may be an unmanned aircraft configured for flight at heights above 60,000 feet. The plurality of satellites may be configured for inter-satellite laser communication without demodulation of laser communication.

Note that the discussion above introduces many different features and many embodiments. It is to be understood that the above-described embodiments are not all mutually exclusive. That is, the features described above (even when described separately) can be combined in one or multiple embodiments.

For purposes of this document, it should be noted that the dimensions of the various features depicted in the FIG.s may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A satellite communications system, comprising:
    a satellite configured for laser satellite-to-satellite communications and laser satellite-to-aircraft communications without demodulation of a received laser communication;
    a communications relay aircraft adapted for flying at altitudes above clouds, the communications relay aircraft comprising:
        a laser communications module to communicate with the satellite using laser communication;
        a Radio Frequency (RF) communications module to communicate with RF equipment at or near ground level using cloud-penetrating RF communications;
        wherein the RF communications module is configured to take first data received as laser communication by the laser communications module and to generate a corresponding RF transmission containing the first data; and
        wherein the laser communications module is configured to take second data received as RF communication by the RF communications module and to generate a corresponding laser transmission containing the second data; and
    a plurality of ground terminals at or near ground level, a first ground terminal configured to communicate with the communications relay aircraft using cloud-penetrating RF communications, configured to communicate with a second ground terminal by communication relayed through the communications relay aircraft and further relayed through the satellite, the first ground terminal configured to communicate directly with the satellite using laser communication and further configured to select a communication path from a plurality of communication paths extending from the first ground terminal to the satellite including a direct laser communication path from the first ground terminal to the satellite and a relayed communication path from the first ground terminal to the satellite that is relayed by the communications relay aircraft for communication between the first ground terminal and the satellite according to communication speeds of the plurality of communication paths.

2. The satellite communications system of claim 1, wherein:
    the satellite is configured for orbiting the Earth in Low Earth Orbit (LEO).

3. The satellite communications system of claim 1 wherein the communications relay aircraft generates a laser signal corresponding to an RF signal received from the first ground terminal, the laser signal relayed through a plurality of satellites by laser satellite-to-satellite communication, and the laser signal amplified by one or more of the plurality of satellites through which the laser signal is relayed.

4. The satellite communications system of claim 1 wherein the communications relay aircraft is a High-Altitude Pseudo Satellite (HAPS) that is adapted for flying at altitudes above 60,000 feet.

5. The satellite communications system of claim 1 wherein the satellite includes a plurality of laser communications modules for communicating with two or more satellites, one or more communications relay aircraft, and one or more ground terminals.

6. The satellite communications system of claim 1 wherein the satellite is configured for only laser communications with other satellites, with a ground terminal, and with the communications relay aircraft.

7. The satellite communications system of claim 6 wherein the satellite is configured to operate as an optical repeater to receive an optical beam from the communications relay aircraft and to relay the optical beam, or a portion of the optical beam, to another satellite.

8. The satellite communications system of claim 7 wherein the satellite is configured to receive the optical beam and to direct the optical beam through one or more optical switches to an optical output that is directed to the other satellite.

9. The satellite communications system of claim 8 wherein the satellite is configured to receive routing information for the optical beam in a routing laser communication that is separate from the optical beam and to demodulate the routing laser communication to determine a destination address.

10. The satellite communications system of claim 6 wherein the satellite does not include RF communication components.

11. The satellite communication system of claim 1 wherein the satellite includes one or more optical amplifiers to amplify a received laser beam for relay to another satellite.

12. The satellite communication system of claim 11 wherein the satellite further includes one or more laser frequency upconverters or laser frequency downconverters.

13. The satellite communication system of claim 1 wherein the satellite is a Low Earth Orbit (LEO) satellite that includes flaps for steering the satellite.

14. The satellite communication of system of claim 13 wherein the satellite does not include any propulsion mechanism.

15. The satellite communication system of claim 1 wherein the communications relay aircraft includes a balloon filled with lighter-than-air gas.

16. A satellite communications system, comprising:
a satellite configured for relaying laser communications without demodulation or modulation of the laser communications including relaying laser communications between one or more satellites and an aircraft or ground and relaying laser communications from a first satellite to a second satellite the satellite is configured to receive routing information for a laser communication in a routing laser communication that is separate from the laser communication, to demodulate the routing laser communication to determine a destination address, and to relay the laser communication to another satellite selected according to the destination address; and
a communications relay aircraft adapted for flying at altitudes above clouds, the communications relay aircraft comprising:
a laser communications module to communicate with the satellite using laser communication;
a Radio Frequency (RF) communications module to communicate with RF equipment at or near ground level using cloud-penetrating RF communications;
wherein the RF communications module is configured to take first data received as laser communication by the laser communications module and to generate a corresponding RF transmission containing the first data; and
wherein the laser communications module is configured to take second data received as RF communication by the RF communications module and to generate a corresponding laser transmission containing the second data.

17. The satellite communications system of claim 16 wherein the satellite is configured for orbiting the Earth in Low Earth Orbit (LEO).

18. A satellite communications system, comprising:
a satellite configured for laser satellite-to-satellite communications and laser satellite-to-aircraft communications without demodulation of a received laser communication; and
a communications relay aircraft adapted for flying at altitudes above clouds, the communications relay aircraft comprising:
a laser communications module to communicate with the satellite using laser communication;
a Radio Frequency (RF) communications module to communicate with RF equipment at or near ground level using cloud-penetrating RF communications;
wherein the RF communications module is configured to take first data received as laser communication by the laser communications module and to generate a corresponding RF transmission containing the first data;
wherein the laser communications module is configured to take second data received as RF communication by the RF communications module and to generate a corresponding laser transmission containing the second data; and
wherein the satellite is configured for only laser communications with other satellites, with ground, and with the communications relay aircraft, to operate as an optical repeater to receive an optical beam from the communications relay aircraft, to direct the optical beam through one or more optical switches to an optical output that is directed to another satellite and thereby relay the optical beam, or a portion of the optical beam, to the other satellite, to receive routing information for the optical beam in a routing laser communication that is separate from the optical beam and to demodulate the routing laser communication to determine a destination address.

19. The satellite communication system of claim 18 wherein the satellite is a Low Earth Orbit (LEO) satellite that includes flaps for steering the satellite.

20. The satellite communications system of claim 18 wherein the communications relay aircraft is a High-Altitude Pseudo Satellite (HAPS) that is adapted for flying at altitudes above 60,000 feet.

* * * * *